US007492417B2

(12) United States Patent
Hirakata et al.

(10) Patent No.: US 7,492,417 B2
(45) Date of Patent: Feb. 17, 2009

(54) METHOD OF MANUFACTURING LIQUID CRYSTAL DISPLAY DEVICE

(75) Inventors: Yoshiharu Hirakata, Kanagawa (JP); Rumo Satake, Kanagawa (JP)

(73) Assignee: Semiconductor Energy Laboratory Co., Ltd., Atsugi-Shi, Kanagawa-Ken (JP)

( * ) Notice: Subject to any disclaimer, the term of this patent is extended or adjusted under 35 U.S.C. 154(b) by 1215 days.

(21) Appl. No.: 09/854,120

(22) Filed: May 10, 2001

(65) Prior Publication Data

US 2002/0024621 A1     Feb. 28, 2002

(30) Foreign Application Priority Data

May 11, 2000   (JP)   ............... 2000-139238

(51) Int. Cl.
  G02F 1/136   (2006.01)
  G02F 1/1333  (2006.01)
  G09G 3/36    (2006.01)
(52) U.S. Cl. .................. 349/33; 349/42; 349/93; 345/87; 345/94; 345/97; 438/40; 438/20
(58) Field of Classification Search ............ 349/153, 349/151, 158, 187, 38, 33, 34, 42, 86, 93, 349/172; 345/87, 92, 94, 97; 438/30, 40
See application file for complete search history.

(56) References Cited

U.S. PATENT DOCUMENTS

| | | | | |
|---|---|---|---|---|
| 5,040,875 A | * | 8/1991 | Noguchi | 349/143 |
| 5,214,523 A | | 5/1993 | Nito et al. | |
| 5,566,009 A | | 10/1996 | Yamazaki et al. | |
| 5,600,485 A | * | 2/1997 | Iwaki et al. | 359/561 |
| 5,936,685 A | * | 8/1999 | Ito et al. | 349/38 |
| 6,108,061 A | * | 8/2000 | Sako et al. | 349/85 |
| 6,115,017 A | * | 9/2000 | Mikami et al. | 345/92 |
| 6,195,139 B1 | | 2/2001 | Yamazaki et al. | |
| 6,232,142 B1 | * | 5/2001 | Yasukawa | 438/69 |

(Continued)

OTHER PUBLICATIONS

Furue, et al., Mesogenic Polymer Stabilized Ferroelectric Liquid Crystal Display Exhibiting Monostability with High Contrast Ratio and Grayscale Capability, Jpn. J. Appl. Phys., vol. 36, pp. L1517-1519, Part. 2, No. 11B, Nov. 15, 1997.

(Continued)

*Primary Examiner*—Walter L Lindsay, Jr.
*Assistant Examiner*—Ron E Pompey
(74) *Attorney, Agent, or Firm*—Fish & Richardson P.C.

(57) ABSTRACT

Disclosed is an active matrix liquid crystal display device designed mainly for alternating electric current drive, in which orientation processing (monostabilization) is performed by a direct current power supply or a direct current voltage applied to a ferroelectric liquid crystal. The liquid crystal is made to respond, and is made monostable while a voltage level is maintained by a storage capacitor. In addition, the liquid crystal may also be made monostable while maintaining a gate clock pulse at a constant level. After forming a transparent conductive film on an element substrate, elements such as TFTs are formed. An electric field is applied by a direct current voltage source between an electrode formed on an opposing substrate and the transparent conductive film. An electric field is applied by a direct current voltage source between the electrode formed on the opposing substrate and the transparent conductive film formed on the back side of the element substrate.

12 Claims, 25 Drawing Sheets

U.S. PATENT DOCUMENTS 6,236,444 B1 * 5/2001 Konuma et al. ............. 349/151
6,618,105 B2    9/2003 Yamazaki et al.
6,704,086 B1 * 3/2004 Dubal et al. ................ 349/172

OTHER PUBLICATIONS

Furue, et al., "Fabrication of a Zigzag Defect-Free Surface-Stabilized Ferroelectric Liquid Crystal Display Using Polyimide Orientation Film", Jpn. J. Appl. Phys., vol. 37, pp. 3417-3421, Part 1, No. 6A, Jun. 1998.

"Orientation Technique of Ferroelectric LDC—defect free and monostabilization," *FPD Intelligence*, pp. 78-82, 1999 with Full English Translation.

Ultra high speed, ultra high contrast full-color liquid crystal display, *Semicon-News Forum 21*, pp. 7-13, 2000 with Full English Translation.

Furue, "Orientation Technique of Ferroelectric LDC-defect free and monostabilization," *FPD Intelligence*, No. 2, pp. 78-82, 1999 with Full English Translation.

Takahashi et al., "Ultra high speed, ultra high contrast full-color liquid crystal display," Monthly Display (Gekkan Display), No. 7, pp. 7-13, Jul. 1, 1999 with Full English Translation.

W.J.A.M. Hartmann, "Ferroelectric Liquid-Crystal Video Display", IEEE Transactions on Electron Devices, vol. 36, No. 9, Sep. 1989, pp. 1895-1899.

* cited by examiner

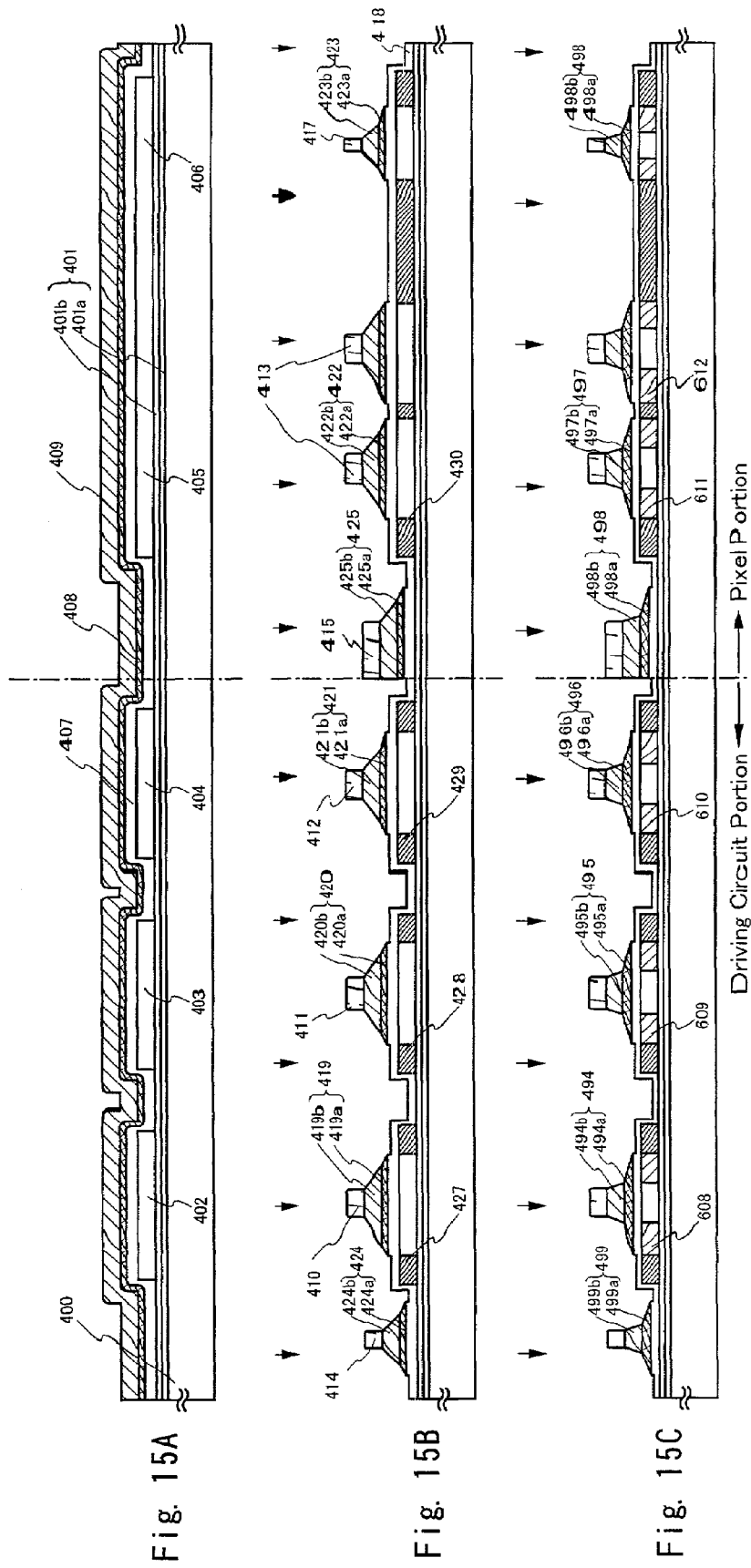

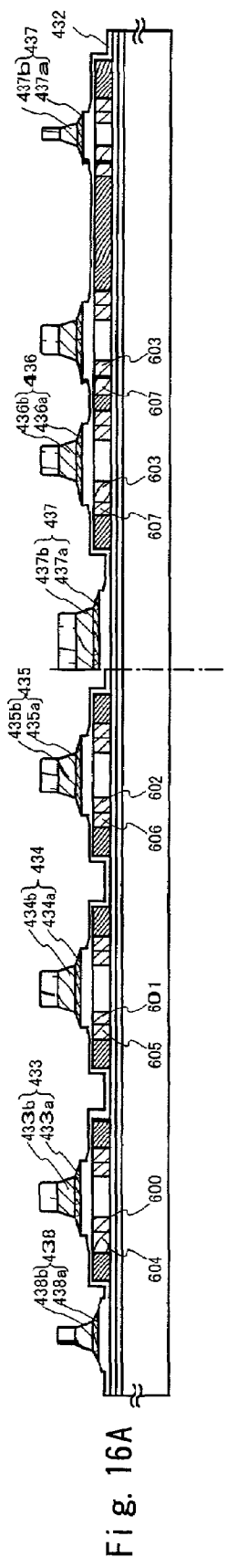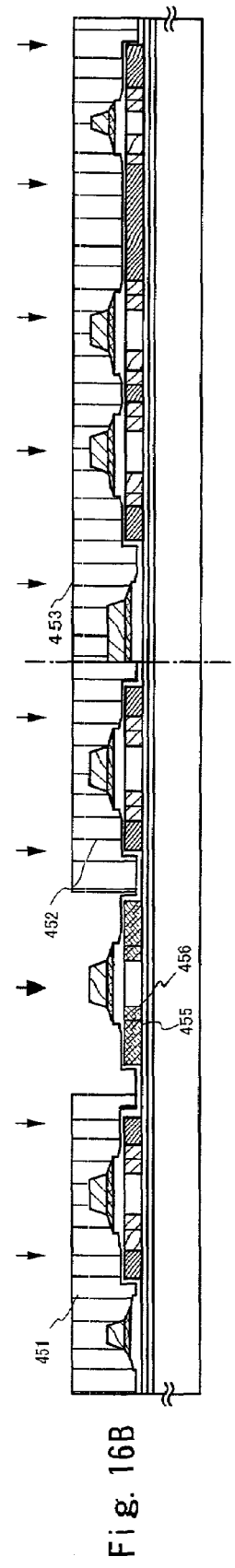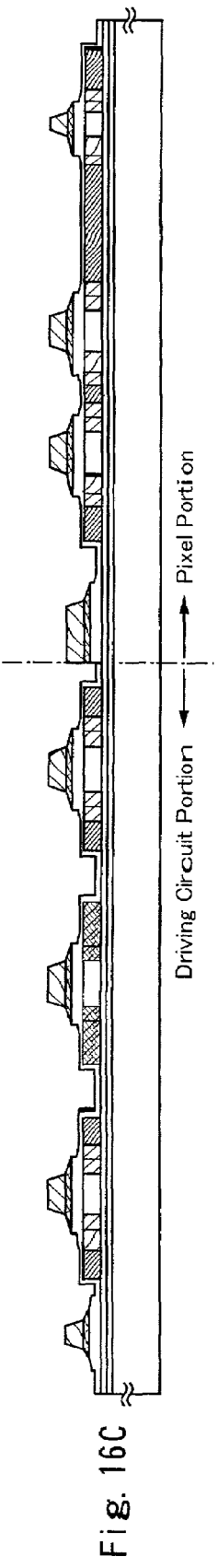

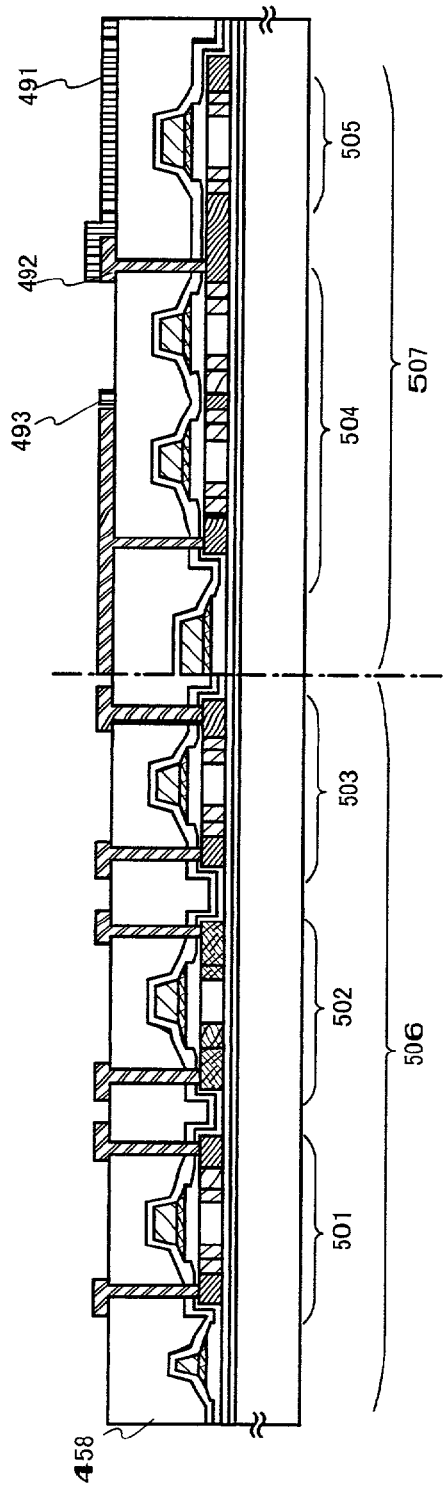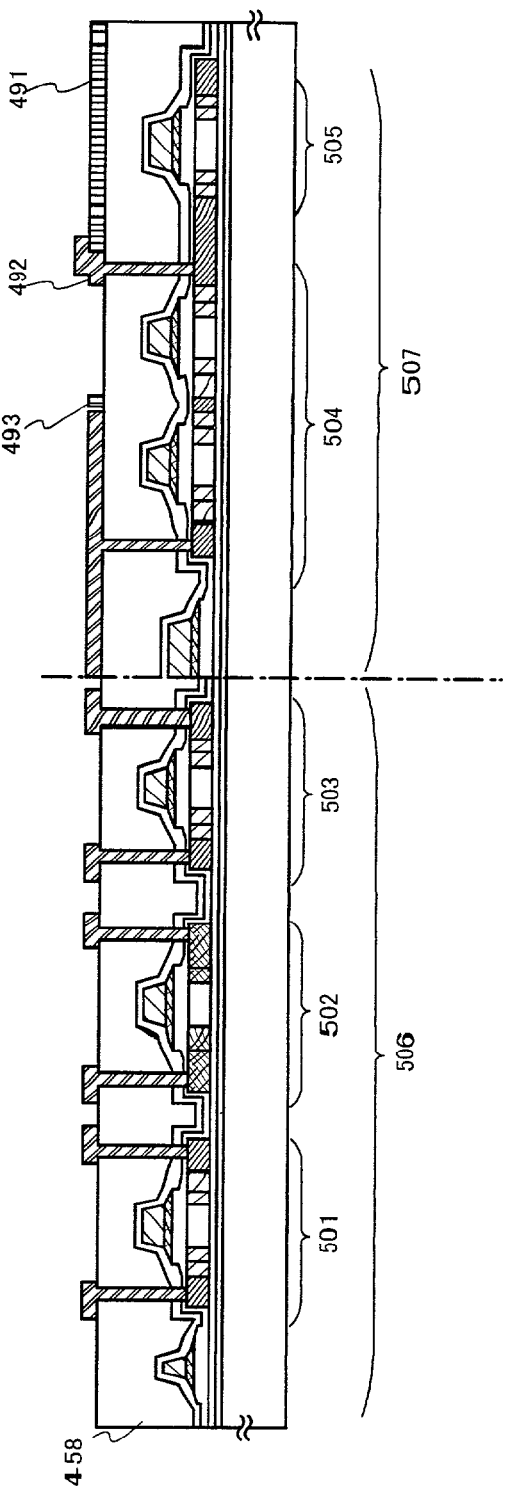

METHOD OF MANUFACTURING LIQUID CRYSTAL DISPLAY DEVICE

BACKGROUND OF THE INVENTION

1. Field of the Invention

In an active matrix liquid crystal display device, a method of applying a direct voltage and monostabilizing the liquid crystal molecules is shown. In particular, a method of monostabilizing the liquid crystal with a layer structure such as a smectic liquid crystal is shown.

This invention may be applied to a method for monostabilizing a liquid crystal which is bistable such as a ferroelectric liquid crystal.

2. Description of the Related Art

The liquid crystal display device has the advantages of being thin, light weight and low in power consumption. The liquid crystal display device is also used in fields where high speed response of a dynamic level is required such as portable television and wall television. Further, a demand for a large screen display and a projector panel such as a 50 inch rear projector is increasing.

As a liquid crystal orientation mode a TN (twisted nematic) mode of the cell gap which is about 4 to 5 μm is generally used due to the easiness of orientation control. However, the TN mode is slow in the response speed of a halftone display near the white level, and in the case of a high speed dynamic display, the liquid crystal response cannot keep up thereby showing flickers.

A flicker is a phenomenon where in a halftone with slow response speed of the liquid crystal, the liquid crystal response cannot track the greed when the image switches, and a tone that is different to that of a display image appears on the screen and can be seen as a flicker. When an object to be displayed moves at a high speed, such a flicker may be seen in the contour where the previous scene and the scene to which it has been switched greatly change in the display tone.

As the material that changes to a nematic liquid crystal, there is a liquid crystal with spontaneous polarization. With the interaction of spontaneous polarization and an electric field, a high speed response for switching at a micro second level may be performed. A smectic liquid crystal with spontaneous polarization is used in a simple matrix method liquid crystal display device by using a high hysteresis steep threshold characteristic.

Of the liquid crystal with spontaneous polarization, the ferroelectric liquid crystal shows hysteresis in a voltage-transmittivity characteristic by making the cell gap thinner, and it is known to be a bigtable material having a memory property. Conventionally these characteristics were utilized and applied in the simple matrix method liquid crystal display device.

However, in the case of displaying the image in the mode having a memory property, there is a need to display an image in the on and off state of the light. In order to realize the halftone of such as gray scale, there is a need to change the display time and control the gradation.

For such a control, there is required a process of an image signal with a complex software, and a large scale circuit with a complex hardware. Further, for measures against problems of display unique to the time scale such as false contours that may be seen due to blinking and action of the observer, and color breakup, a large number of processes for software and hardware are needed. In this way, aside from the actual panels, even in the peripheral circuits, there is a large burden on cost and design.

Further, even if a liquid crystal which moves at a high speed with the above method is used, for realization of a halftone, there are needed a plurality of sub-fields for control of the light flickering period, so that for display of the image the characteristic was not satisfactorily used.

Therefore by applying an analog value voltage to the liquid crystal that can respond at high speed, there is tested a realization of a displaying method.

As a smectic liquid crystal that can perform analog gradation, recently the development of a polymer stabilized ferroelectric liquid crystal (PS FLC) which has monostabilized the ferroelectric liquid crystal with liquid crystal polymer, and obtained a characteristics without hysteresis is progressing. By injecting the ferroelectric liquid crystal added with a small amount of liquid crystal polymer (2 wt %) to a liquid crystal panel, and applying a direct voltage of about 1 to 15V whilst irradiating ultraviolet rays onto the entire surface of the liquid crystal panel, the polymer stabilized ferroelectric liquid crystal may suppress the hysteresis characteristic therein and obtain an analog gradation.

Note that, polymer stabilization refers to the process of adding light and heat to a liquid crystal and a liquid crystal polymer for polymerization reaction of the liquid crystal polymer. Further, monostabilization is a process for eliminating a bistable state or hysteresis seen in ferroelectric liquid crystal, and obtaining an analog characteristic that fixes transmittivity by an electric field. When a polymer is stabilized whilst applying a single polarity voltage, one of the orientation state of the bistable ferroelectric liquid crystal is strongly stabilized, and is considered that a monostable state is realized (FPD Intelligence 1999. 2, p 78-82).

FIG. 24A is a voltage-transmittivity characteristic of a bistable ferroelectric liquid crystal, and FIG. 24B is a monostable ferroelectric liquid crystal characteristic. The lateral axis shows the voltage and the vertical axis shows the transmittivity. Since the bistable ferroelectric liquid crystal memorizes the arrangement state where the orientation direction of spontaneous polarization formed by application of electric field is matched, the hysteresis is large. A monostabilized ferroelectric liquid crystal is realized with an analog characteristic where the memory property and the hysteresis are eliminated and the transmittivity gradually increases when voltage is applied.

FIG. 23 shows a top view of a simple matrix type liquid crystal display device. According to the simple matrix type liquid crystal display device, the substrate with scanning lines ($Y_1$ to $Y_8$) arranged in a stripe shape in the row direction, and the substrate with signal lines ($X_1$ to $X_8$) arranged in a stripe shape in the column direction are pasted together so that the signal lines and the scanning lines are orthogonal, and is configured by filling liquid crystals in between the substrates.

According to the liquid crystal display device formed of transparent electrodes patterned into 8 columns in the vertical direction as shown in FIG. 23 and transparent electrodes patterned into 8 columns in the lateral direction, the polymer stabilized ferroelectric liquid crystal has attained driving in the field sequential method, and has expectations as an orientation method for high speed response (Semicon-news FORUM 21 preliminary report p 7-13, date of lecture Feb. 24, 2000).

According to a simple matrix liquid crystal display device as shown in FIG. 23, when a monostabilization process is performed, a direct current voltage is applied from a direct current power source in between the rectangularly patterned conductive film, and the orientation axis of the liquid crystal molecules are matched to a one direction of a cone.

However, according to the simple matrix liquid crystal display device, there is a problem that when the number of rows of the scanning line increases, the contrast of display significantly decreases. Recently, in the active matrix liquid crystal display device that may realize a high definition and a high contrast, an analog signal is applied to control an image, and to obtain an image quality with good display characteristics is realized.

However, according to the active matrix liquid crystal display device, the circuit is structured with the alternating current drive originally as the main object, and there was not proposed a method of stabilizing the polymer by a direct current power source or a direct current voltage.

According to the active matrix liquid crystal display device, since the pixel electrode is independent through the pixel TFT, a signal necessary for monostabilization from the outside may not be directly applied to the pixel electrode.

In the conventional active matrix liquid crystal display device, a method of applying a voltage of a single polarity over a long period of time to a liquid crystal with a convenient method and performing a polymer stabilization process is required.

The present invention of the active matrix liquid crystal display device, discloses means for applying an electric field to the mixture of a polymer material added with liquid crystal and polymerization agents, and adding an energy and hardening the polymerization agent by a chemical reaction.

Note that, this energy is an energy to be added for chemical reaction of the polymerization agent. The method of adding energy is light irradiation or adding heat. When adding a light polymerization agent to the polymer material, the polymerization agent may have a chemical reaction by light irradiation. In a material absorbing i line, g line, and h line, the ultraviolet rays are irradiated to the polymerization agent to start the light reaction. When adding the thermal polymerization agent to the polymer material, the chemical reaction of the thermal polymerization agent by heating is started.

First, in explaining about the polymer material added with a polymerization agent, when the added polymerization agent has a light polymerizing property or a heat polymerizing property, the orientation of the liquid crystal is stabilized by a bridging reaction by energy such as light and heat. In this way, a liquid crystal characteristic with a differing characteristic compared to that before applying energy (for example, a threshold characteristic) is obtained. As a polymer material a liquid crystal polymer may be used.

When a liquid crystal polymer is used as a polymer material, a bridging reaction of a liquid crystal polymer occurs by adding energy to the added polymerization agent. The liquid crystals are oriented along the bridged liquid crystal polymer side chain, to obtain a stable orientation. When a bistable liquid crystal orientation is stabilized to a one direction, the threshold characteristics and the like of the liquid crystal changes as compared with when energy is applied.

As the liquid crystal, for example, a smectic liquid crystal as researched in Science University of Tokyo in Yamaguchi, for example, a ferroelectric liquid crystal may be used (Semicon-news FORUM 21, preliminary report, p 7-13, lecture date: Feb. 24, 2000).

In the active matrix liquid crystal display device, there is a limit in the voltage value that may be applied to the liquid crystal layer, but according to the present invention, a large voltage may be applied to the liquid crystal layer of an active matrix liquid crystal display device. Further, in the circuit of an active matrix liquid crystal display device with an alternating current drive as a main object, a direct current voltage may be applied to a liquid crystal.

The present invention is characterized in that as shown in FIG. 10, an electric field is applied to a mixture of a liquid crystal and a polymer material by a transparent conductive film 510 formed on a substrate 508 and a conductive sheet 300 formed on a substrate 400, and simultaneously, energy is added to the mixture of a liquid crystal and a polymer material. If the electric field is applied by using a direct-current power supply, a direct voltage can be applied.

FIG. 10 is a cross sectional view of the pixel portion and the terminal portion of the active matrix liquid crystal display device. With the configuration of FIG. 10, an arbitrary voltage can be applied to the liquid crystal layer. Further, electrodes for applying a voltage to the liquid crystal layer are the transparent conductive film 510 on the opposing electrode and the conductive sheet 300 formed on a back surface of the element substrate. Therefore, a direct voltage can be applied to the liquid crystal by using a conventional liquid crystal display device as it is. With the configuration of FIG. 10, an arbitrary direct voltage can be applied to the liquid crystal layer. However, the voltage is applied to the liquid crystal layer through the element substrate, and thus, a high voltage needs to be applied in order to supply a predetermined voltage to the liquid crystal layer. Therefore, a device for supplying such a predetermined voltage, such as a direct high-voltage power supply is required, Further, the present invention is characterized in that as shown in FIG. 6, after a conductive film 200 is formed on the element substrate 400, an element is formed. The electric field is applied to the mixture or a liquid crystal and a polymer material by the transparent conductive film 510 formed on the opposing substrate 508 and the conductive film 200. Simultaneously, energy can be applied to the mixture of a liquid crystal and a polymer material. If a direct-current power supply is used, a direct voltage can be used as the voltage applied to the mixture.

FIG. 6 is a cross sectional view of the pixel portion and the terminal portion of the active matrix liquid crystal display device. With the configuration of FIG. 6, an arbitrary voltage can be applied to the liquid crystal layer. Further, since a voltage is applied between the conductive film 200 on the element substrate and the transparent conductive film 510 provided on the opposing substrate through a first interlayer film 457 and a second interlayer film 458, the value of a direct-current power supply for applying a direct voltage is not necessarily so large. On the contrary, one electrode for applying the direct voltage to the liquid crystal layer is the conductive film 200 provided on the element substrate 400. A TFT is formed above the conductive film, and thus, the temperature of the process of forming the TFT is limited by heat resistance of the conductive film.

Further, the present invention is characterized in that in the active matrix liquid crystal display device, as shown in FIG. 2, while a voltage with single polarity is applied to the pixel electrode in continuous frames, the liquid crystal is made to response at a predetermined position, and thereafter, while a voltage applied to the liquid crystal layer by a storage capacitor is retained, energy is applied to the mixture of a liquid crystal and a polymer material. Thus, there is obtained the same effect as that by applying a voltage to the liquid crystal layer by the direct-current power supply.

FIG. 2 shows a timing chart in case of operating a liquid crystal display device with a line sequential driving and an optical response of a liquid crystal layer. In FIG. 2, external signals input to the liquid crystal display device, signals input to a pixel portion of the liquid crystal display device, and voltages applied to pixels of the pixel portion are shown. A gate start pulse 103, and a gate clock pulse 104 as the external signals, a source driver output 112 and a gate pulse 106 as the signals input to the pixel portion, and electric potentials of the pixels connected to gate lines $g_1$ to $g_n$ of the pixel portion are shown.

With the configuration of FIG. 2, the liquid crystal layer is made monostable by changing a signal input from the outside in the conventional liquid crystal display device. It is necessary to set the external signal such that a signal output to a source wiring has the same polarity over the plurality of frames. On the contrary, since a direct voltage can be applied to the liquid crystal layer for a long period with the transparent conductive film on the opposing substrate and the pixel electrode of the element substrate, the value of the direct-current power supply for applying the direct voltage is not necessarily so large. If only setting of the external signal is changed, the direct voltage can be applied to the liquid crystal layer in the conventional liquid crystal display device or the driver circuit of the conventional liquid crystal display device.

Further, according to the active matrix liquid crystal display device of the present invention, the plurality of continuous frames as shown in FIG. 1 maintain the gate start pulse 114, to be input to the gate driver from the outside, at a certain level, and are made so that a charge may be supplied to the liquid crystal layer and the storage capacitance at all times. As a result, even if there is a leak of current such as the storage capacitance, the fluctuation of the voltage applied to the liquid crystal layer may be prevented. Then, a feature that the same polarity voltage is applied to the pixel electrode, and energy is added to the mixture of the liquid crystal and the polymer material. As a result, the same effect as the case where voltage is added to the liquid crystal layer by a direct-current power supply is obtained.

FIG. 1 shows a timing chart when the lines are driven subsequently and an optical response of the liquid crystal layer. FIG. 1 shows an external signal to be input to the liquid crystal display device, a signal to be input to the pixel portion of the liquid crystal display device, and a voltage to be input to the pixel of the pixel portion as an external signal. A gate start pulse 114 which is input to the liquid crystal display device as an external signal, a gate pulse 115 to be input to the pixel portion, and the potential of the pixels connected to gate lines $g_1$ to $g_n$ differ to FIG. 2.

The configuration of FIG. 1 needs to change the gate start pulse of the external signals compared to FIG. 2. However, similar to the configuration of FIG. 2, a direct current voltage may be applied to the liquid crystal with the configuration of the driver circuit of the conventional liquid crystal display device and the conventional liquid crystal display device.

The advantages and disadvantages of each configuration of this invention are compared, and as a method for applying a direct current voltage to a liquid crystal in an active matrix liquid crystal display device, a more generalized method is a method where the liquid crystal display device has a conventional configuration as shown in FIGS. 1 and 2, and the external signal to be input to the liquid crystal display device is altered.

BRIEF DESCRIPTION OF THE DRAWINGS

In the accompanying drawings:

FIGS. 15A to 15C show cross sectional views of a process of manufacturing the pixel portion and a driver circuit portion of the liquid crystal display device of Embodiment 1;

FIGS. 16A to 16C show cross sectional views Of the process of manufacturing the pixel portion and the driver circuit portion of the liquid crystal display device of Embodiment 1;

FIGS. 19A and 19B show cross sectional views of a process of manufacturing the pixel portion and a driver circuit portion of the liquid crystal display device of Embodiment 3;

DETAILED DESCRIPTION OF THE PREFERRED EMBODIMENTS

First to fourth means can be applied with the present invention. These are explained in detail below.

Embodiment Mode 1

The first means is disclosed in Embodiment Mode 1.

Figure 2:
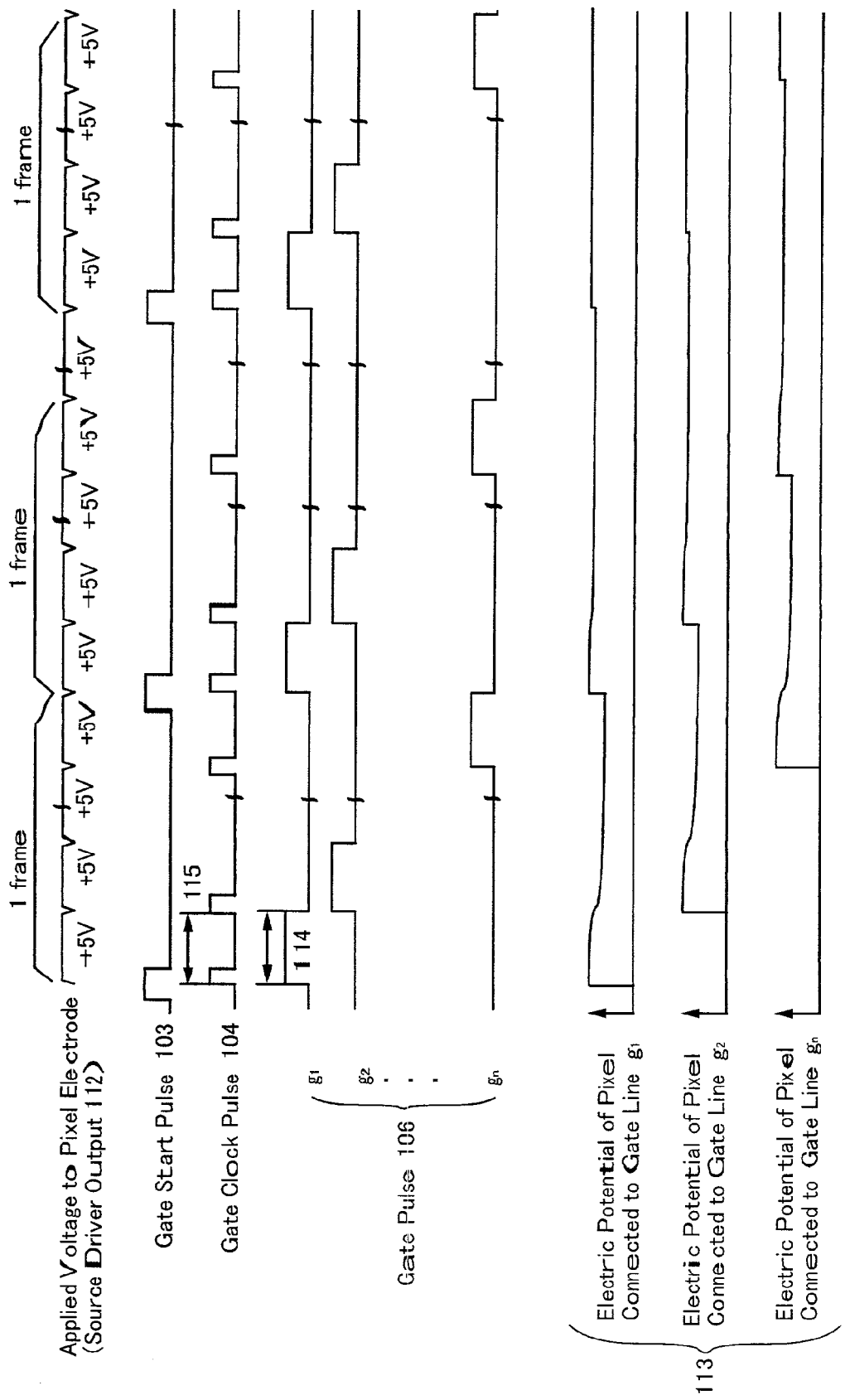
FIG. 2 shows a method of driving when performing polymer stabilization processing of Embodiment Mode 1.

The first means is shown below. FIG. 2 shows a line sequential drive timing chart and the optical response of a liquid crystal layer. An active matrix liquid crystal display device contains n rows of gate wiring formed in a horizontal direction, and m rows of source wiring formed in a vertical direction.

Figure 25:
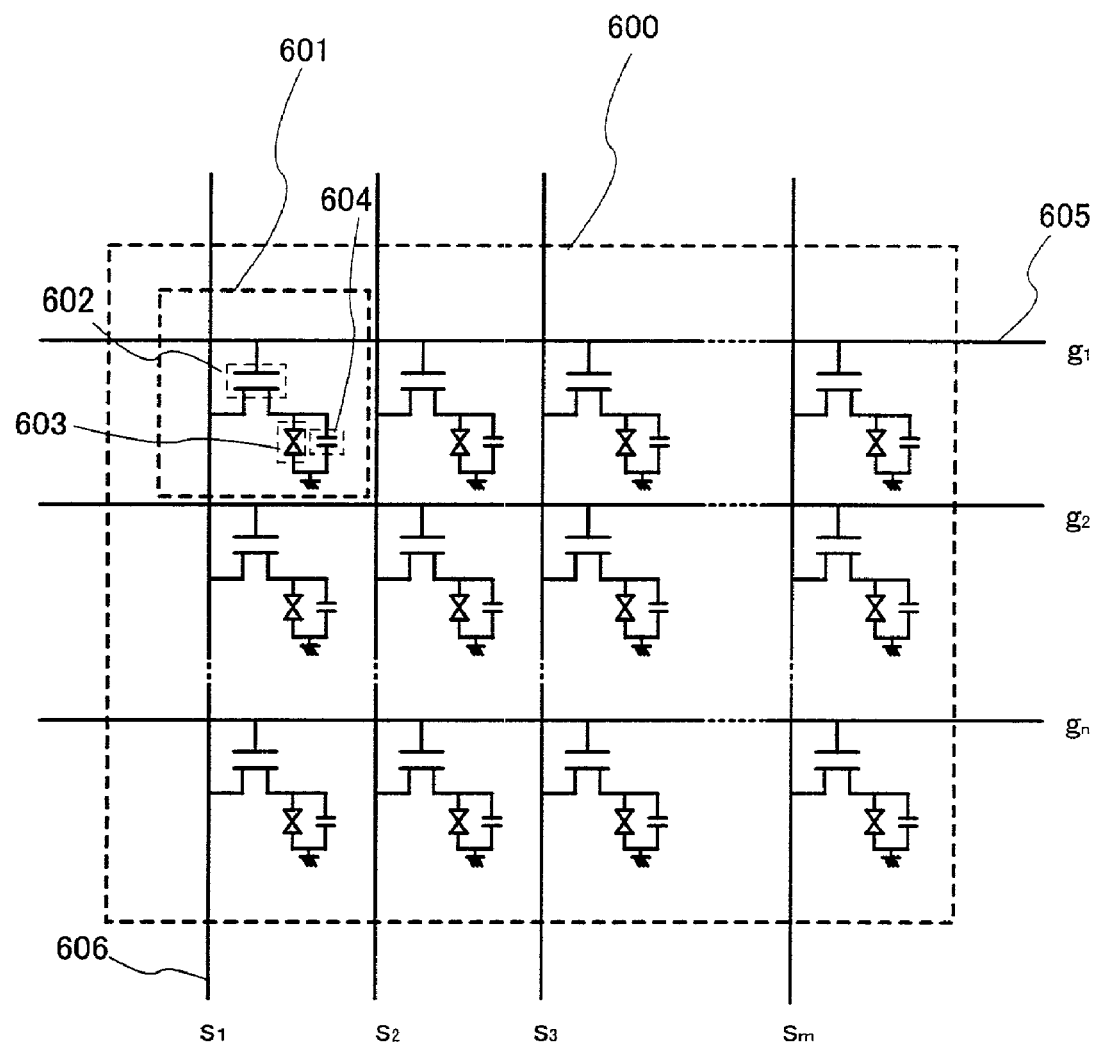
FIG. 25 shows a pixel portion circuit for explaining Embodiment Mode 1.

FIG. 25 shows a pixel portion circuit 600. Each pixel 601 in the pixel portion has a pixel TFT 602, a storage capacitor 604, and a liquid crystal cell 603. The liquid crystal cell is a cell having a structure in which a liquid crystal layer is sandwiched between two electrodes, through an orientating layer. A pixel TFT gate electrode is connected to any one of gate wirings 605 having addresses from $g_1$ to $g_n$. One of a source region and a drain region of the pixel TFT is connected to any one of source wiring 606 having addresses from $s_1$ to $s_m$, and the other is connected to one electrode of the storage capacitor and to the liquid crystal cell.

An element substrate of the liquid crystal display device has a pixel portion and a driver circuit portion formed in the periphery of the pixel portion.

The driver circuit portion uses circuits such as CMOS circuits, in which driver circuit TFTs are combined. External signals such as gate pulses and gate clock pulses are input to the gate driver, while external signals such as an original picture signal, a horizontal synchronous signal, and a partition clock signal are input to the source driver. The original picture signal is selected and stored by these signals, and applied to predetermined pixels.

Figure 3:
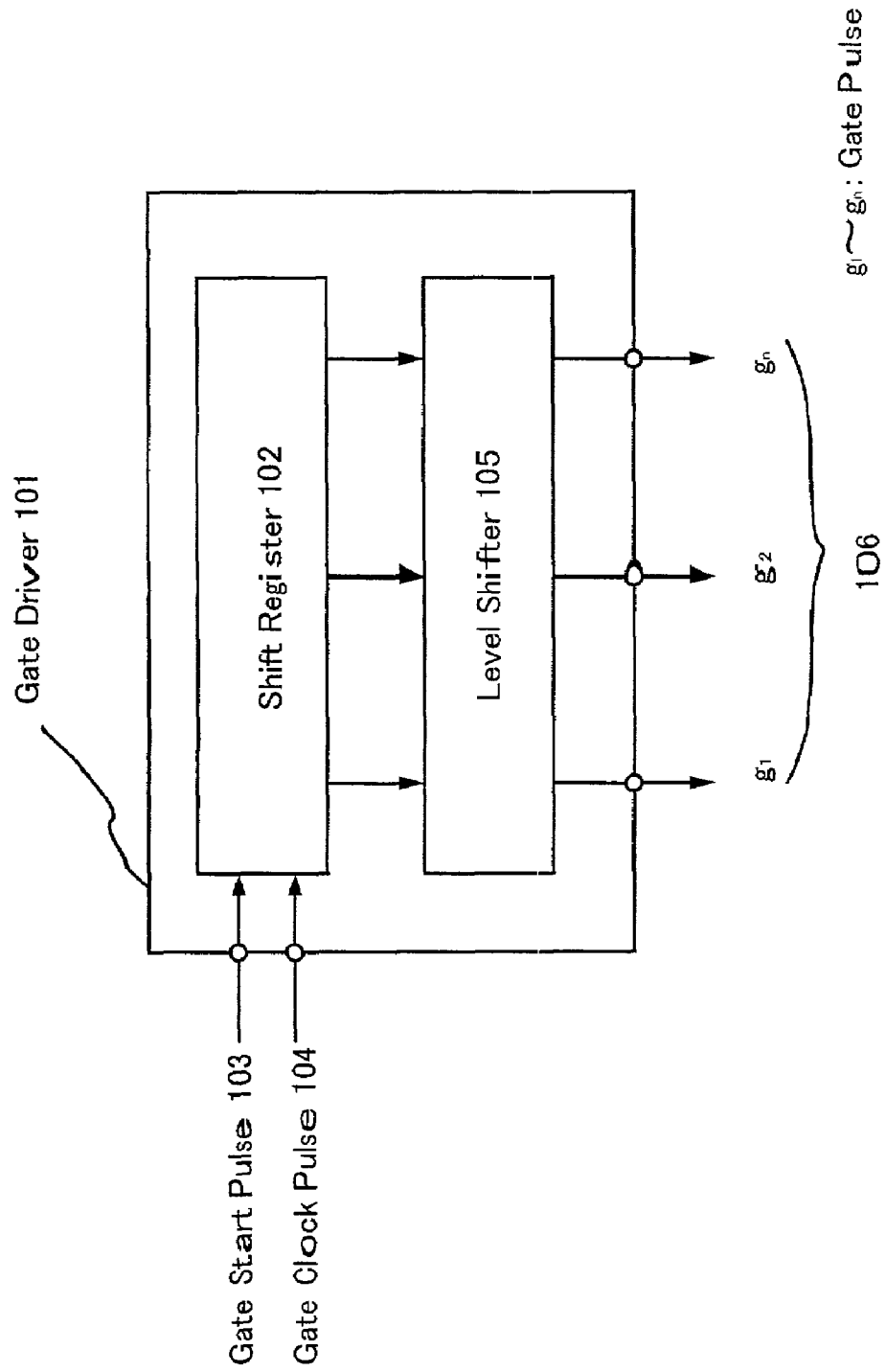
FIG. 3 shows a gate driver circuit stricture of Embodiment Mode 1.

FIG. 3 is a block diagram for explaining operation of the gate driver. Among signals input from the outside to a gate driver 101, a gate start pulse 103 is a perpendicular synchronous signal showing the point where the first screen of the original picture signal begins. A gate clock pulse 104 is a clock of a shift register 102, and shifts a gate start pulse 101.

A selection pulse is formed based on the gate start pulse 103 and the gate clock pulse 104 input to the shift register 102. The selection pulse is supplied, in accordance with its pulse width, to the gate wiring of a predetermined row to thereby determine the period during which the source and the drain of pixel TFT are in the conductive state.

The selection pulse is converted, through a level shifter 105, into a voltage necessary in order to place the pixel TFT into a conducting state. This pulse is referred to as a gate pulse 106. The gate pulse is input to the gate wirings having addresses from $g_1$ to $g_n$.

Figure 1:
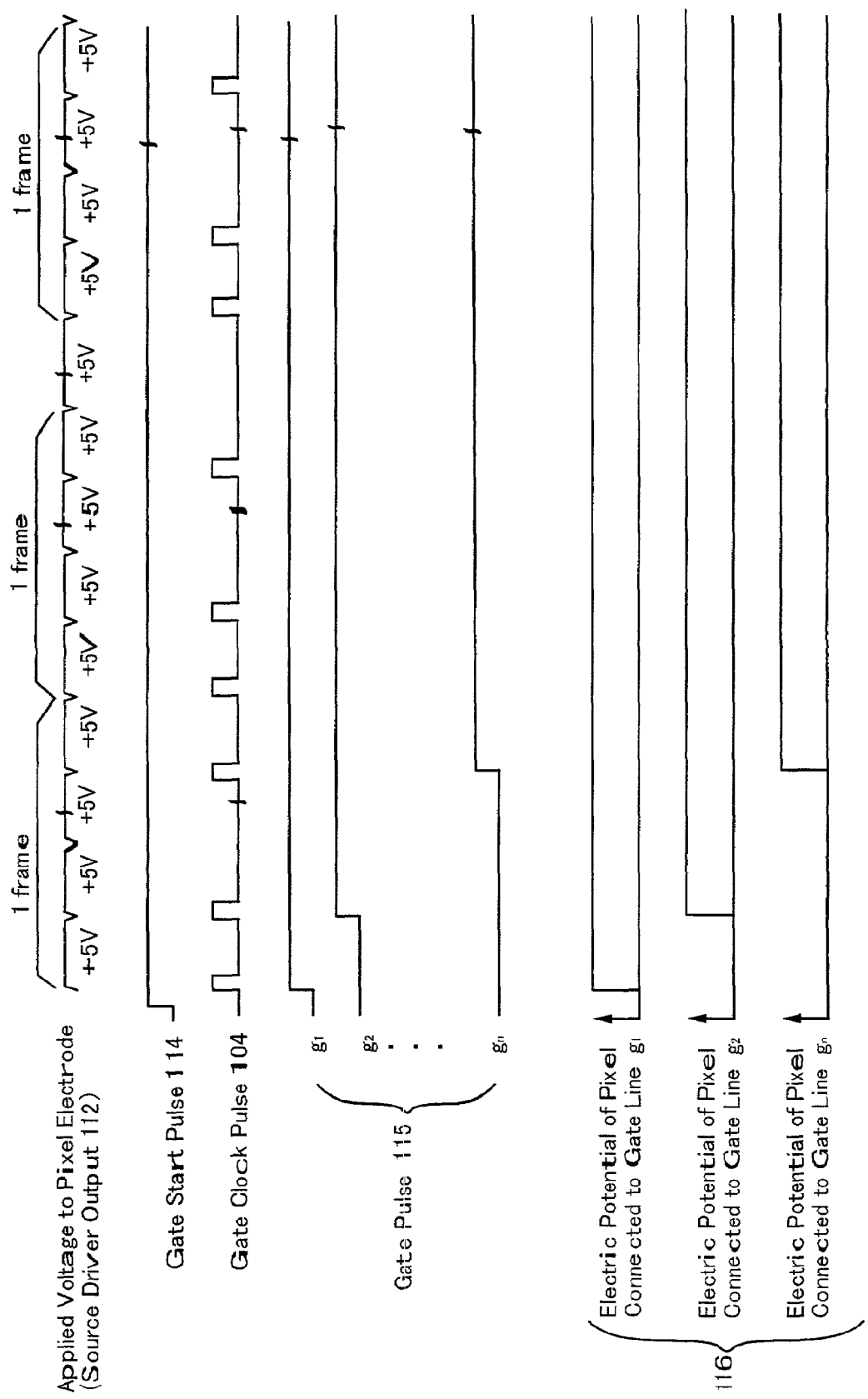
FIG. 1 shows a method of driving when performing polymer stabilization processing of Embodiment Mode 2.

Operation of the gate driver is explained in accordance with FIG. 2 and FIG. 1. The gate start pulse 103 and the gate clock pulse 104 are input to the shift register 102 of the gate driver 101 as external signals: as in FIG. 3. The gate start pulse 103 possesses a predetermined amplitude pulse at the beginning of the frame to be displayed on the screen, as in FIG. 2. The gate clock pulse 104 possesses predetermined amplitude pulses at the end of each row (gate wiring). The selection pulse (not shown in the figures) indicates selection of one gate wiring at the same period as a pulse interval period 115 between the gate clock pulses 104.

The selection pulse voltage level is then converted by the level shifter 105 connected to the shift register, and a voltage sufficient to switch an active layer of a TFT element is imparted to the gate wiring a; the gate pulse 106. The gate wirings are selected in order from the one at the top of the screen in accordance with the gate pulse.

If the gate start pulse 103 is only output for a predetermined period in the beginning of one frame, then a period 114 for selecting one gate wiring becomes equal to the period 115.

Figure 4:
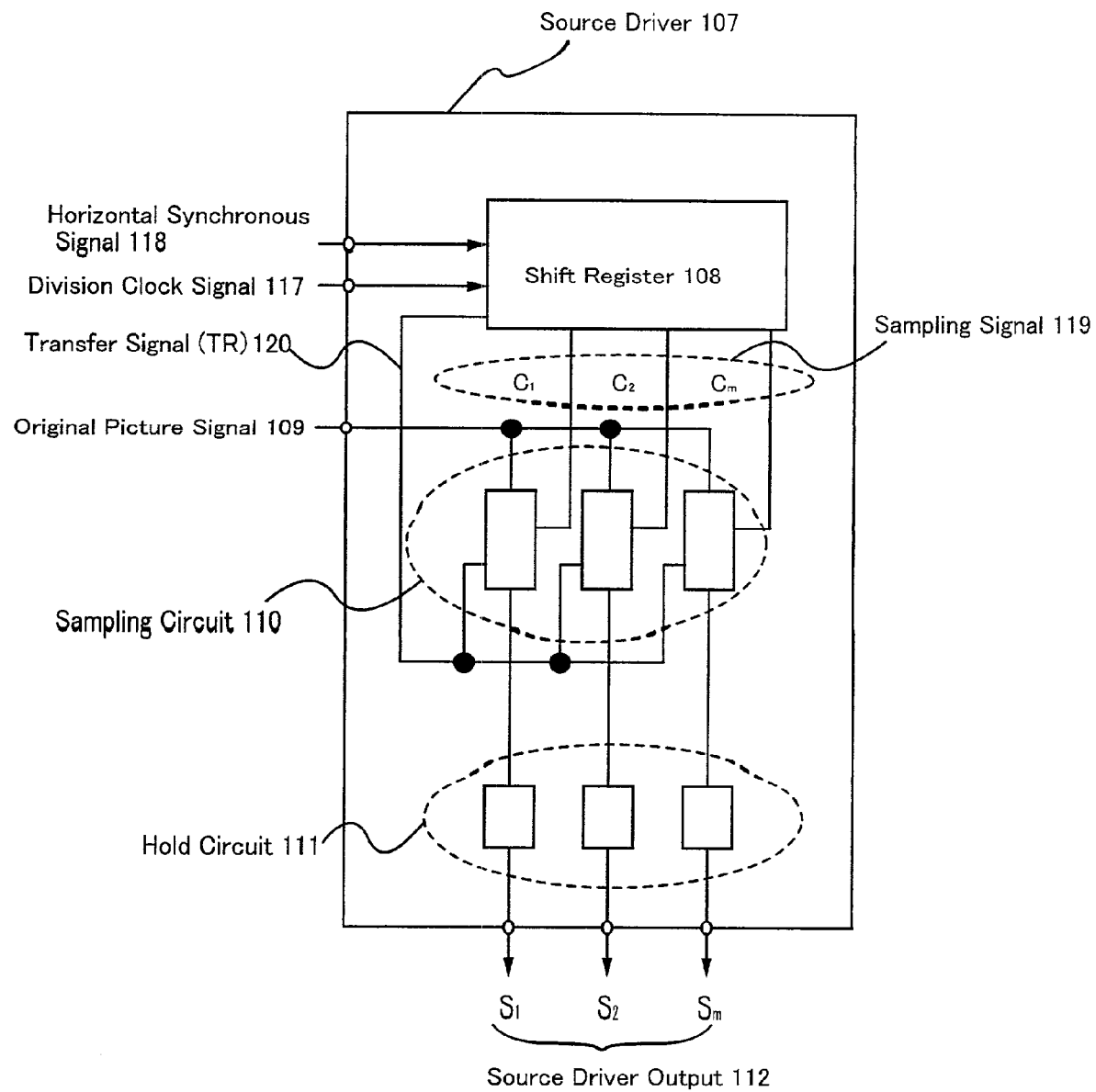
FIG. 4 shows a source driver circuit structure of Embodiment Mode 1.

FIG. 4 is a clock diagram of a source driver. A division clock signal 117 and a horizontal synchronous signal 118 are input to a shift register 108, and sampling signals 119 ($C_1$ to $C_m$) are generated in order to correctly extract the signal which must be applied to one row of pixels from the original picture signal of the shift register.

An original picture signal 109 selected by the sampling signal becomes one row portion of pixel data, and is transferred to a hold circuit 111 by a transfer signal (TR) 120.

The voltage which must be applied to each pixel becomes stored in the hold circuit 111, and a voltage equal to the stored level is output to the source wiring when the pixel TFT is placed into a conductive state by the gate pulse. The signal output to the source wiring from the source driver is referred to as a source driver output 112, for convenience.

Operation of a source driver 107 is explained referring to FIG. 4. The original picture signal 109 is divided into data for each line of the gate wirings by the sampling signals $C_1$ to $C_m$ in the shift register 108 of the source driver. The divided data is stored in a sampling circuit 110. After the data is stored for a fixed period, the transfer signal TR is input, and the data divided in the hold circuit 111 is stored. Then, in synchronous with the gate pulse, source driver output 112 ($S_1$ to $S_m$) is output to each source wiring. One row portion of data output at the same time as the source driver outputs 112 ($S_1$ to $S_m$) is referred to as line sequential drive.

As shown in FIG. 2, a voltage corresponding to the source driver outputs 112 is applied to the pixel electrodes. A voltage 113 applied to the liquid crystal layer during line sequential drive with the source driver output as +5 V is shown. All of the source driver outputs within the pixels are set to +5 V, and therefore all of the pixels of the selected gate wiring show a fixed electric potential.

During a period 114 in which the gate wiring is selected, an electric charge for generating an electric potential difference corresponding to the source driver output is supplied to the liquid crystal cells and the storage capacitors connected to the pixel TFTs which have been placed in a conductive state. Further, even if the spontaneous polarization of the ferroelectric liquid crystal is inverted, an electric charge compensating for a drop in the voltage due to the inversion of the spontaneous polarization is supplied to the liquid crystal cells. The electric potential of the liquid crystal cells and of the storage capacitors is therefore fixed within this period.

After the gate selection period 114 is complete, a voltage drop occurs due to the inversion of the spontaneous polarization of the ferroelectric liquid crystal, and the brightness of the voltage applied to the liquid crystal layer falls. In this case, the liquid crystals are made to respond by imparting electric potentials having the same polarity over several frames to the pixel electrodes.

If the same polarity electric potential is imparted to the pixel electrodes over a predetermined amount of time, and the liquid crystals are made to cumulatively respond, then the inversion of the spontaneous polarization of the liquid crystal ends, and the orientation direction of the liquid crystal is uniformly determined. The consumption of the electric charge by the inversion of the spontaneous polarization then stops, and the electric potential of the liquid crystal cell and the electric potential of the storage capacitor are nearly the same in the period for selecting the gate wiring and after completion of the period for selecting the gate wiring.

The final electric potential of the liquid crystal layer and the storage capacitor becomes +5 V by cumulative response. At the point when the inversion of the spontaneous polarization is complete, ultraviolet rays may be irradiated, performing monostabilization of the ferroelectric liquid crystal.

Figure 5:
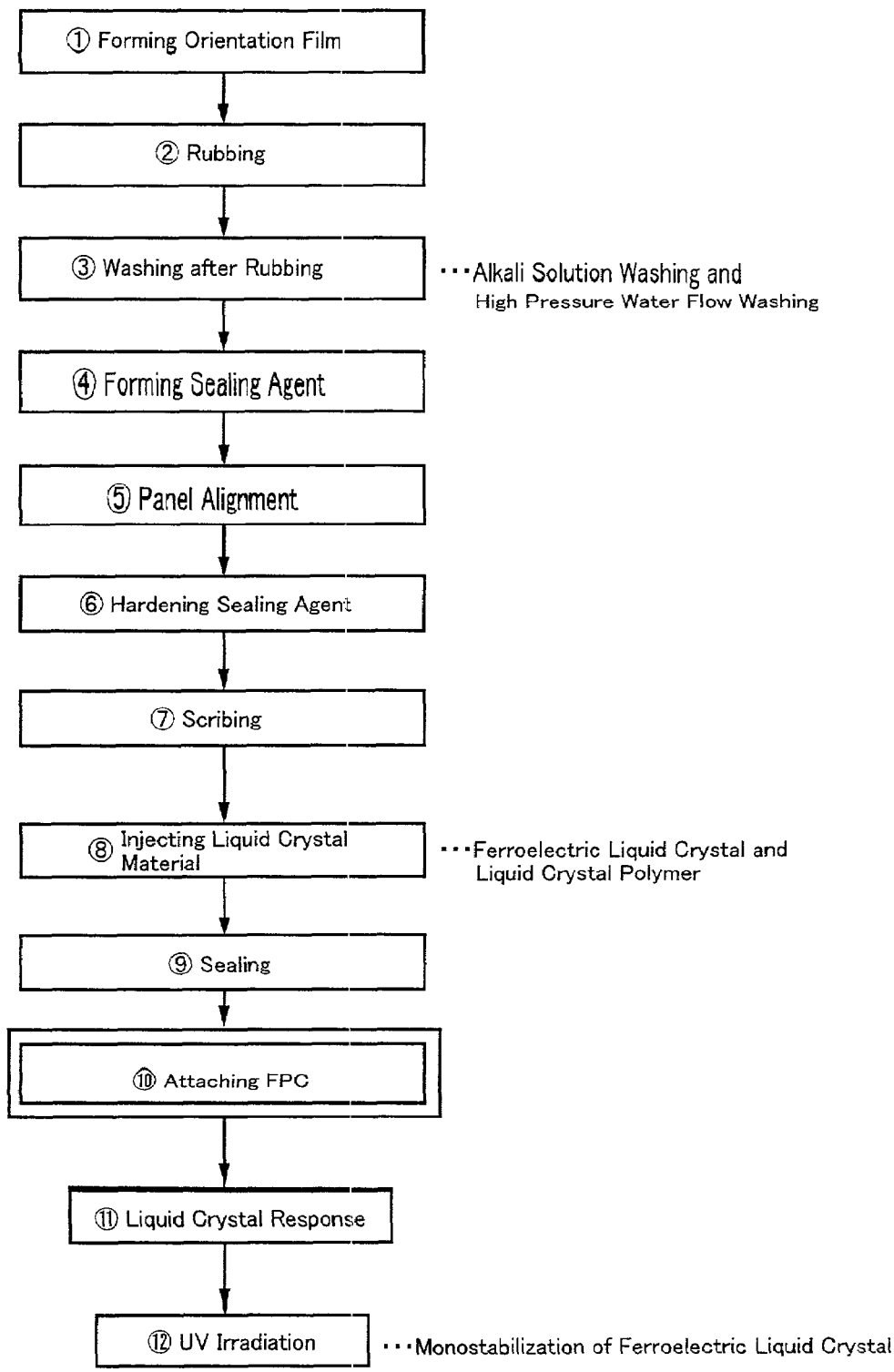
FIG. 5 shows the processing order when performing the polymer stabilization processing of Embodiment Mode 1 and Embodiment Mode 2.

FIG. 5 shows the process order for manufacturing a liquid crystal display device of the present invention on a flow chart. Formation of an oriented film (1) through sealing of a liquid crystal panel injection port (9) is completed. After then attaching a flexible printed circuit by using an anisotropic conductive film (10), the liquid crystal is made to respond to a plurality of frames (11) while the liquid crystal display device is driven. After completion of the liquid crystal response, the electric potential is stored as is in the storage capacitor, and the ferroelectric liquid crystal is made monostable in accordance with ultraviolet rays irradiation (12).

The element substrate and the opposing substrate having rubbed orientation films are joined so that the surfaces on which the orientation films are formed face each other, and after joining them by hardening a sealing material, they are cut into separate panels. A liquid crystal material is injected between the element substrate and the opposing substrate, the injection port is sealed by using a sealant, and an FPC (flexible printed circuit) is attached to an external terminal. The ferroelectric liquid crystal is made monostable by inputting an external signal, through the flexible printed circuit, and applying a voltage to the liquid crystal of the liquid crystal display device thus formed.

Embodiment Mode 2

The second means is disclosed in Embodiment Mode 2.

The second means of the present invention is developed from the first means.

There are active matrix display devices which do not have storage capacitors. Further, there are cases in which a sufficient capacitance cannot be insured due to the aperture ratio. A method for making liquid crystals monostable in this type of case is proposed.

With line sequential drive, electric charge is supplied to the liquid crystal layer only during the period 114 for selecting the gate wiring, as shown in FIG. 2. However, if the voltage retention of the liquid crystal layer is poor with the active matrix liquid crystal display device, or if electric current leaks from the storage capacitor, the voltage applied to the liquid crystal layer fluctuates. The voltage thus fluctuates when performing polymer stabilization.

Pixel TFTs are placed in a conductive state during the period in which the gate wiring is selected, and electric charge is supplied to the storage capacitor and the liquid crystal cell, through the pixel TFT, from the source wiring. Therefore, even if the electric charge is consumed by a cause such as a leak currents form the storage capacitor, electric charge which will just supplement the consumed electric charge is supplied through the pixel TFT, and the electric potential of the storage capacitor, and that of the liquid crystal cell, becomes fixed.

However, for constructions in which there are no storage capacitors, or if a sufficient storage capacitance cannot be guaranteed, the electric potential applied to the liquid crystal of the pixel will fluctuate due to the off leak characteristics of the pixel TFT and the electric current leak of the liquid crystal layer during the period in which the gate wiring is not selected.

There is a fear that, if polymer stabilization processing is performed in this state, the direction of the liquid crystals after polymer monostabilization will become unstable.

However, a fixed voltage can be applied to the liquid crystal layer in accordance with the second means, even if there is current leak from the storage capacitor or the liquid crystal layer.

FIG. 1 shows a timing chart of a line sequential driving and a voltage applied to the liquid crystal layer. An active matrix liquid crystal display device includes gate wirings provided in a row direction and source wirings provided in a column direction. The same components of FIG. 1 as those of FIG. 2 are indicated by the same symbols.

The different point of FIG. 1 from FIG. 2 is explained in detail. When performing polymer stabilization of a ferroelectric liquid crystal, the gate start pulse 114 is always output at a constant level. Thus, the gate pulse 115 is always selected in the polymer stabilization. Electric charge can always be applied to the liquid crystal layer and the storage capacitor when the polymer stabilization is performed.

When the gate start pulse 114 is output at a constant voltage over a plurality of frames, the gate pulse 115 is held at a constant voltage level over the plurality of frames irrespective of a pulse cycle of the gate clock pulse 104 so that the gate wirings are always selected. A constant original image signal is supplied, and thus, all the pixel TFTs are in the conductive state over the plurality of frames. Therefore, a constant voltage can always be applied to the liquid crystal of a pixel portion.

Accordingly, variation of an electric potential of the liquid crystal layer is suppressed due to current leak in the polymer restabilization, and thus, a constant voltage can be applied to the liquid crystal layer.

The voltage 116 that is applied to the liquid crystal layer is stable in electric potential because the storage capacitor and the liquid crystal layer are always charged with electric charge.

FIG. 5 shows the process order in a flow chart. Formation of an orientation film (1) through sealing of a liquid crystal panel injection port (9) is completed. Then, after attaching a flexible printed circuit by using an anisotropic conductive film (10), a constant electric potential is applied to the liquid crystal while the active matrix liquid crystal display device is driven. After completion of the liquid crystal response (11), the ferroelectric liquid crystal is made monostable in accordance with ultraviolet rays irradiation (12).

An element substrate and an opposing substrate having rubbed orientation films are bonded together such that surfaces on which the orientation films are formed face with each other. These substrates are bonded together by hardening a sealing agent, and then the substrates are divided into respective panels. A liquid crystal material such as a ferroelectric liquid crystal or liquid crystal polymer is injected between the element substrate and the opposing substrate, the injection port is sealed by the sealing agent, and an FPC (flexible printed circuit) is attached to an external terminal. In the liquid crystal display device thus formed, a signal is input from the external terminal through the FPC, a constant voltage is applied to the predetermined liquid crystal of the pixel portion, and the ferroelectric liquid crystal is made monostable while ultraviolet rays are irradiated.

The gate start pulse as an external signal input to the liquid crystal display device from the FPC retains a constant voltage value. Thus, the gate pulse input to the gate wirings retains a constant voltage over the plurality of frames, and the pixel TFTs are in the conductive state over the plurality of frames. Then, an electric charge that compensate for the minute variation of electric potential due to the current leak and movement of impurity ions is always supplied to liquid crystal cells, and thus, the voltage applied to the liquid crystal in monostabilization can be made constant.

Embodiment Mode 3

In Embodiment Mode 3, polymer stabilization proceeding of a ferroelectric liquid crystal is performed using the third means.

The third means adds an electrode for monostabilization on an active matrix substrate. In other words, an absolute value of a direct voltage applicable in the polymer stabilization from a withstand voltage of an element is about 5 to 7 V in the active matrix liquid crystal display device, and the maximum value of the direct voltage in the polymer stabilization processing is limited. However, by means of the third means, there is no limitation on the direct voltage value, and a voltage can be applied to the liquid crystal layer.

Figure 6:
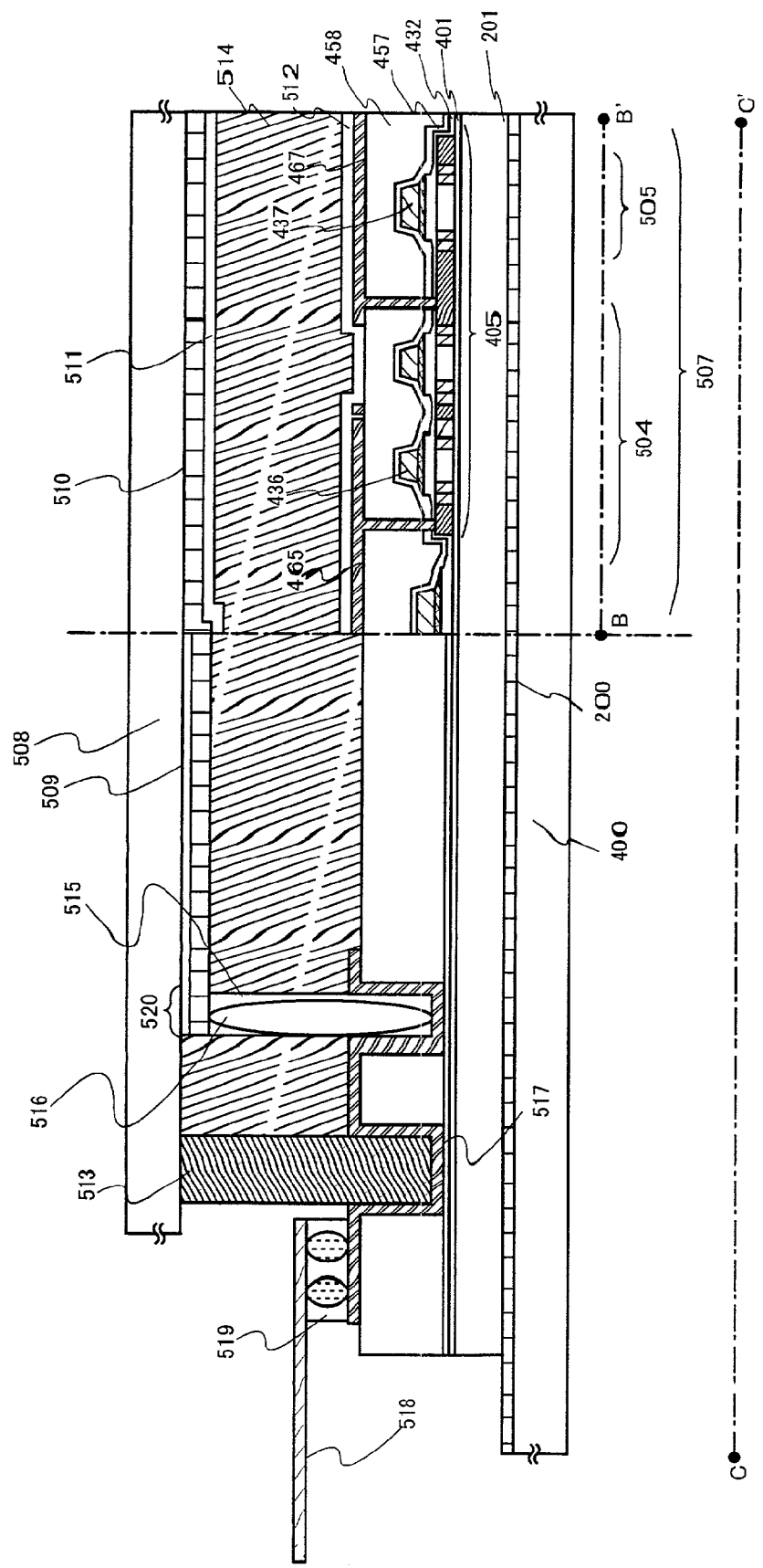
FIG. 6 shows a cross sectional view of a liquid crystal display device of Embodiment Mode 3.
Figure 7:
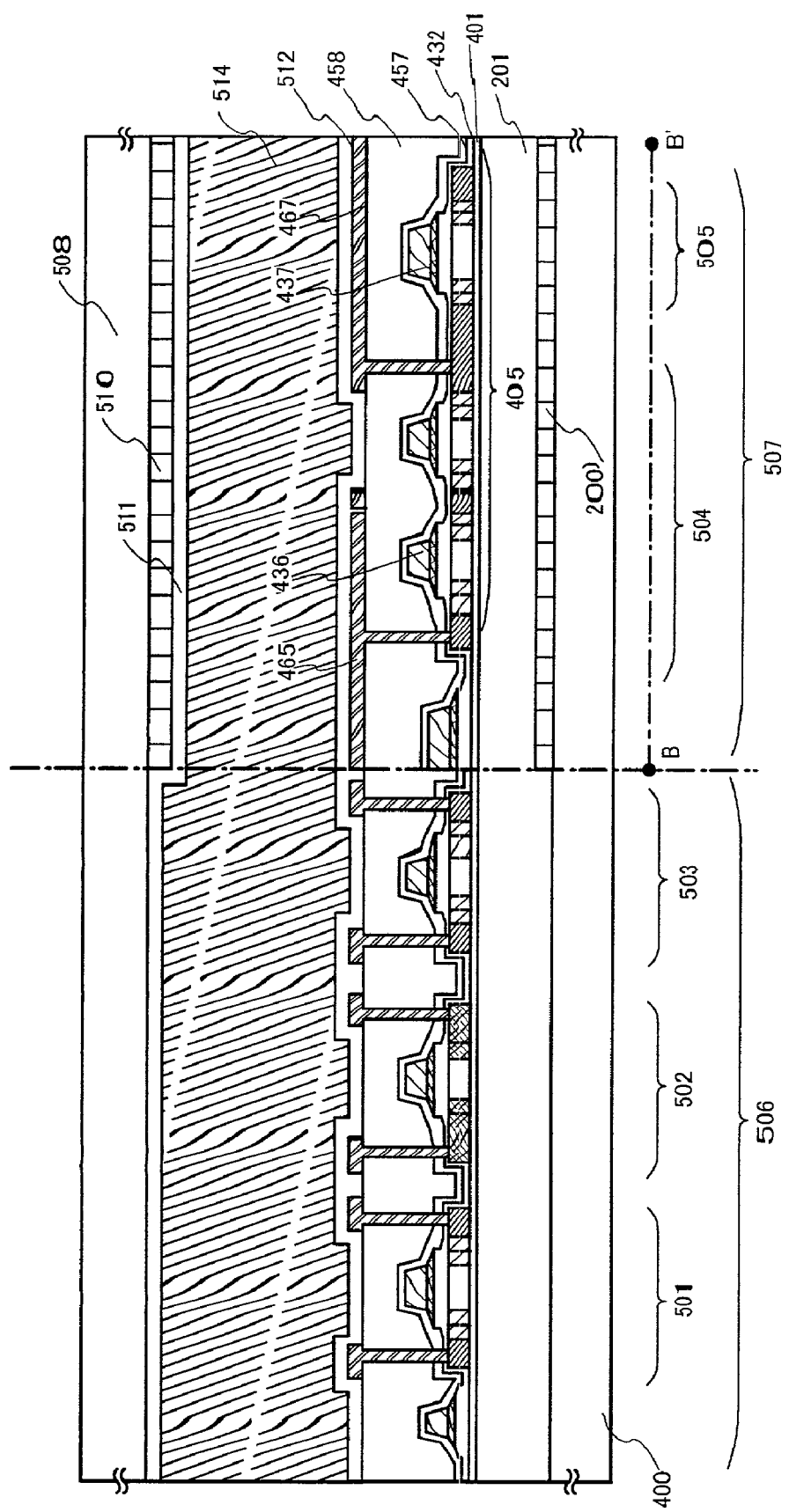
FIG. 7 shows a cross sectional view of a pixel portion and a driver circuit portion of the liquid crystal display device of Embodiment Mode 3.
Figure 8:
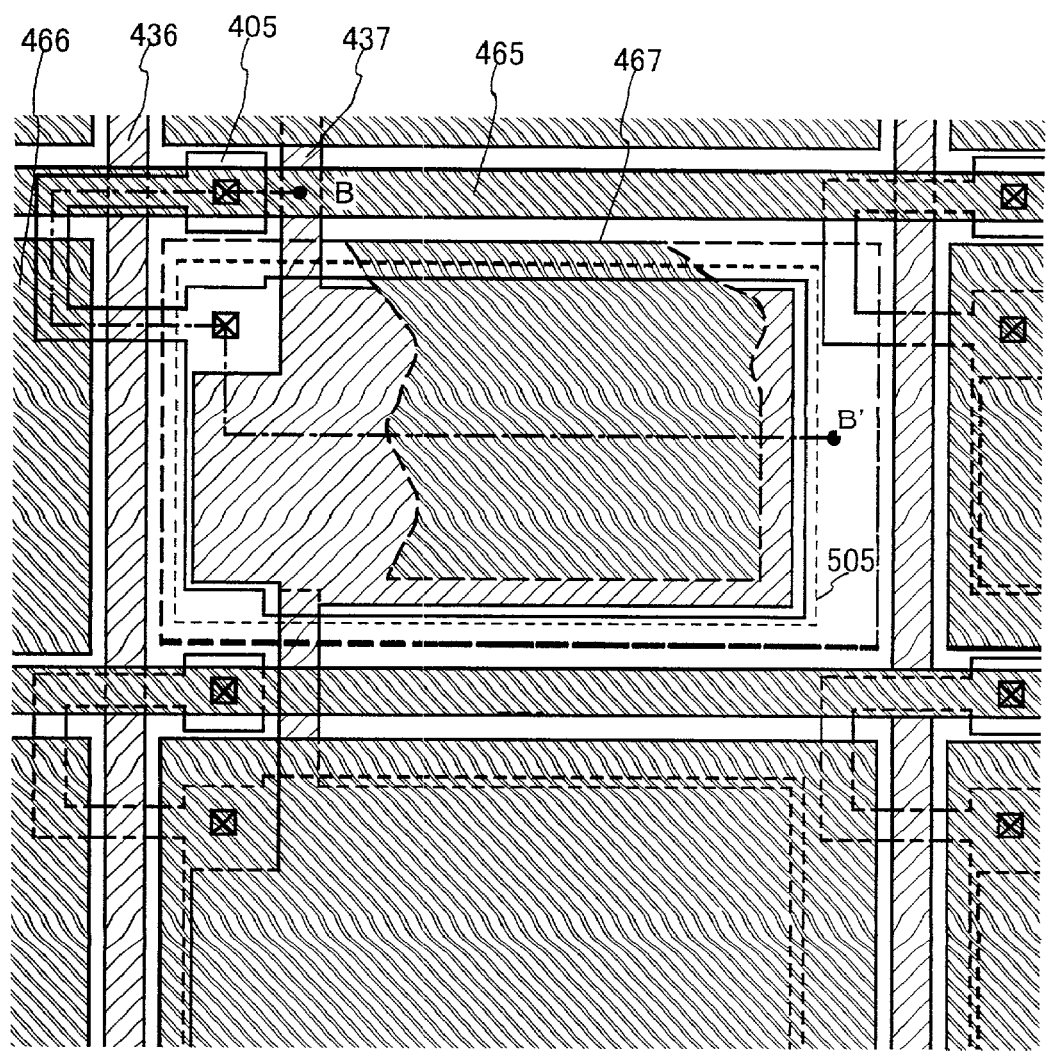
FIG. 8 shows a top surface diagram of a pixel portion of a liquid crystal display device of Embodiment 1.
Figure 9:
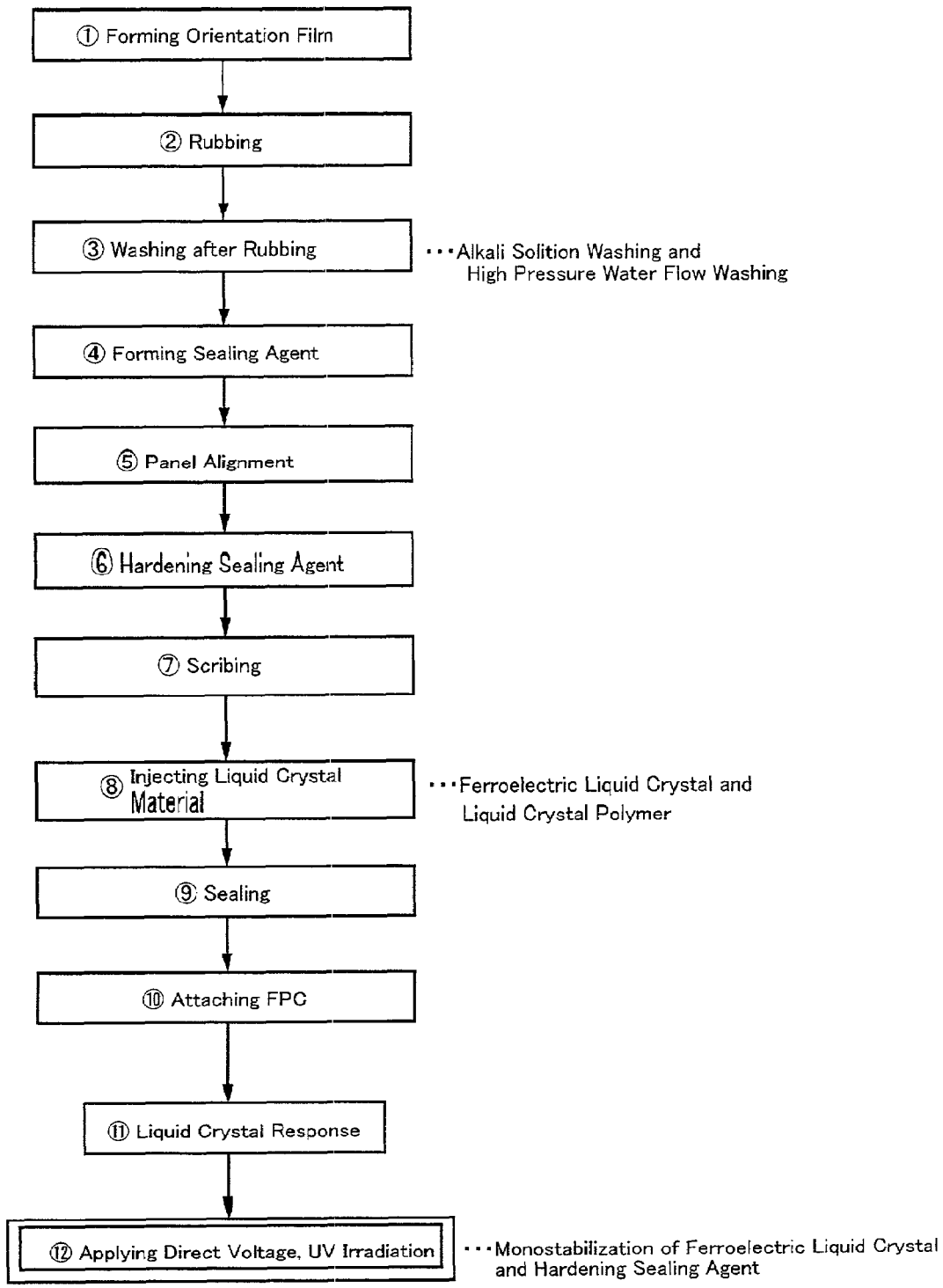
FIG. 9 shows the processing order when performing the polymer stabilization processing of Embodiment Mode 3.

A manufacturing process of the third means is explained with reference to FIGS. 6 to 9 and FIG. 14. A dashed line C-C' of FIG. 6 corresponds to the cross section taken along with the dashed line C-C' in a top view of FIG. 14. A dashed line B-B' of FIGS. 6 and 7 corresponds to the cross section taken along with the dashed line B-B' of a top view of FIG. 8. The same components in FIGS. 6 to 8 and FIG. 14 are indicated by the same reference numerals. FIG. 9 shows the process order in the polymer stabilization. The manufacturing process of the element substrate in FIGS. 6 to 8 is explained in detail in embodiments.

Figure 14:
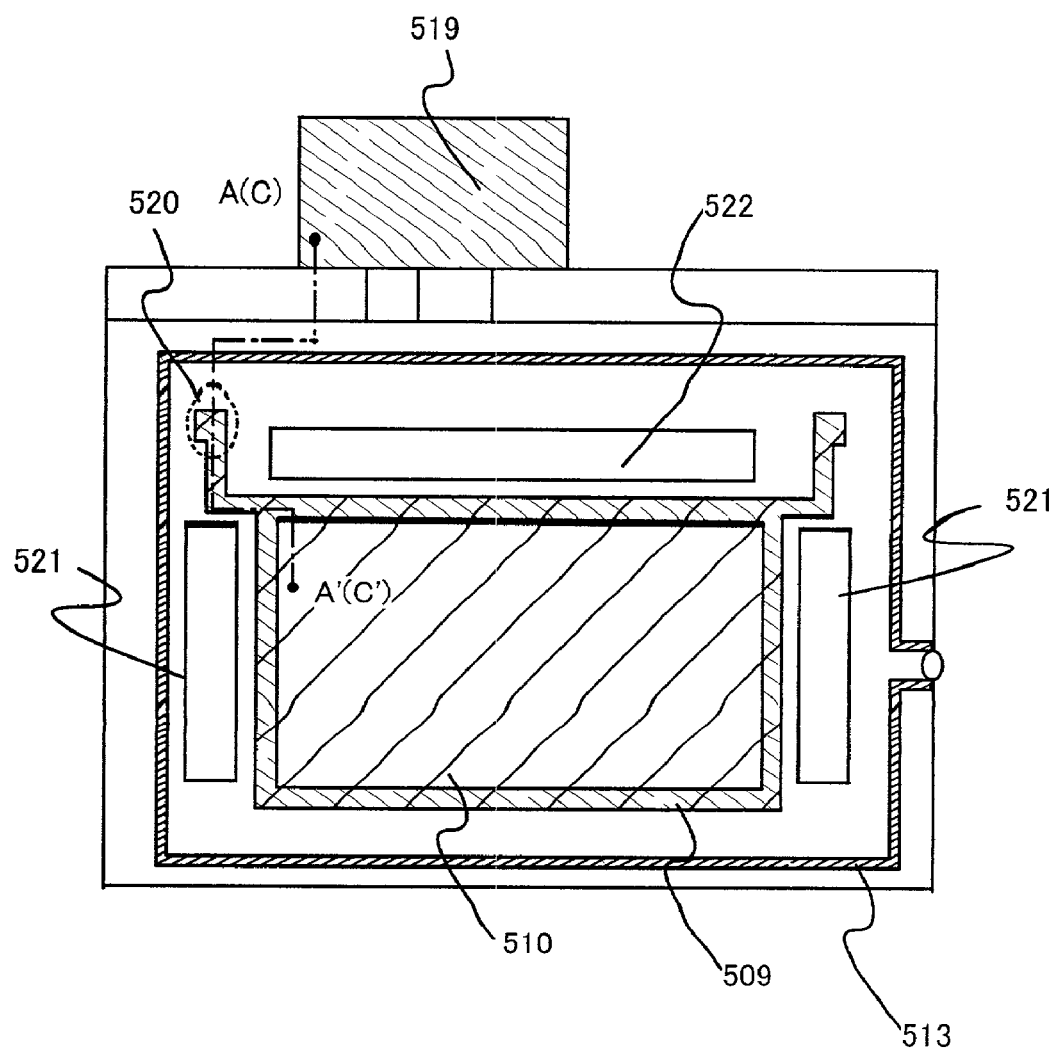
FIG. 14 shows a top surface diagram of a liquid crystal display device.

FIG. 14 is a top view of a liquid crystal display device. A transparent conductive film 510 and a light shielding film 509 are formed on an opposing substrate. A common pad 520 of the opposing substrate is of a lamination structure of the transparent conductive film 510 and the light shielding film 509. A gate driver 521 and a source driver 522 are formed on the element substrate. The element substrate and the opposing substrate are bonded to each other by a sealing agent 513. A flexible printed circuit 518 is attached to the element substrate.

The common pad indicates a pad for making the element substrate and the opposing substrate in a conductive state through a conductive material, and has a size of 100 to 1000 by 100 to 1000 μm square.

As shown in FIG. 6, a characteristic of the third means is that a conductive film 200 is formed on an element substrate 400. For example, an indium oxide—tin oxide (ITO) film can be used for the conductive film 200.

A silicon dioxide film or a silicon oxynitride film is formed with a thickness of 1 to 6 μm on the conductive film 200 as a film 201 having low relative dielectric constant. Thus, a parasitic capacitance between the element wiring and the conductive film 200 is reduced.

Impurities such as alkali metal which flow out from a glass substrate are prevented from contaminating semiconductor layers by a base film 401. A silicon nitride film, a silicon dioxide film or the like may be used as the base film. For example, a silicon nitride (SiN) film is formed with a thickness of 10 to 100 nm.

Further, a semiconductor layer 405, a gate insulating film 432, a gate electrode 436, a capacitor electrode 437, a first interlayer film 457, a second interlayer film 458, a source wiring 465, and a pixel electrode 467 are formed, thereby completing the element substrate. A lead wiring 517 for attachment of the flexible printed circuit is further formed on the element substrate. The pixel electrode 467 is formed of a transparent conductive film in case of a transmission type liquid crystal display device, In case of a reflection type liquid crystal display device, the pixel electrode is formed of a thin conductive film having a function of reflecting light.

The light shielding film 509 is formed on the opposing substrate 508. Chromium or the like may be used for the light shielding film.

The transparent conductive film 510 is formed on the light shielding film 509. An indium oxide—tin oxide (ITO) film may be used for the transparent conductive film.

Orientation films 511 and 512 are formed on the element substrate and the opposing substrate. A material with a low pretilt angle and satisfactory surface flatness may be used for the orientation films for the satisfactory orientation of the ferroelectric liquid crystal. The thicknesses of the orientation films are preferably 30 to 80 nm in order to suppress voltage loss due to the orientation films.

The orientation films 511 and 512 are subjected to a rubbing process. The rubbing direction is made to be parallel.

A common pad of the opposing substrate is formed from a conductive paste. The conductive paste is formed by mixing a conductive spacer 516 into a sealing agent 515. The conductive spacer is formed by coating a surface of a particle spacer with gold powder. The transparent conductive film 510 on the opposing substrate and the lead wiring 517 for the attachment of the flexible printed circuit are electrically connected with each other by the conductive paste.

The sealing agent 515 is used for the conductive paste as the main material, but there is a sealing agent that compress only about 2.5 μm depending on the material. Thus, it is difficult to form a cell gap of 1 to 2 μm required for the orientation of the ferroelectric liquid crystal. Therefore, in a region where the conductive paste is formed, the film 201 having a low relative dielectric constant or the second interlayer film 458 is removed by etching, and thus, the cell gap in the pixel portion is preferably made small.

The opposing substrate and the element substrate are pasted together by the sealing agent 513. In the region where the sealing agent 513 is formed, a low relative dielectric constant film 201 or a second interlayer film 458 are removed by etching, and the cell gap in the pixel portion is preferably made small.

The opposing substrate and the element substrate are cut.

A liquid crystal material 514 is heated to an isotropic phase and is injected. After it is confirmed that the liquid crystal material is injected to the entire surface of a liquid crystal panel, the liquid crystal material is gradually cooled to at a room temperature at 0.01 to 3° C./min. Satisfactory orientation can be obtained by gradually cooling the liquid crystal material.

A mixture of a ferroelectric liquid crystal, a liquid crystal polymer and a polymerization initiator are used as the liquid crystal material 514. For example, Felix M4851/100 of Clariant Corp. is used as the ferroelectric liquid crystal. A liquid crystal acrylate monomer UCL-001 of Dainippon Ink and Chemicals Inc. as the liquid crystal polymer mixed with the polymerization initiator of 2 to 3 wt. % is used. A small amount (2 wt. %) of the liquid crystal acrylate monomer is added to the ferroelectric liquid crystal.

The flexible printed circuit 518 is attached to the lead wiring 517 by an anisotropic conductive film 519. Thus, a direct voltage is applied between the flexible printed circuit 518 and the conductive film 200, thereby performing the polymer stabilization of the liquid crystal material 514.

The transparent conductive film 510 of the opposing substrate is connected to the lead wiring 517 of the element substrate through the conductive spacer 516 Therefore, a voltage having single polarity is applied to both the flexible printed circuit connected to the lead wiring 517 of the element substrate through the anisotropic conductive film and the conductive film 200 on the element substrate, and thus, the voltage is applied to the liquid crystal layer, thereby performing the polymer stabilization with single polarity.

Function Generator "MODEL275" of Wavetek Corp. may be used, for example, as the device for applying a direct voltage.

A direct voltage is applied between the conductive film 200 and the transparent conductive film 510 disposed on the opposing substrate. The value of the direct voltage of a power supply is changed based on the relative dielectric constant of the liquid crystal material, the thickness of the interlayer film of the element substrate, and the voltage desirably applied to the liquid crystal layer. Taking the thickness of the interlayer film, the cell gap, and the like into consideration, the direct voltage value of the power supply is determined.

As shown in FIG. 7, in the active matrix liquid crystal display device using polysilicon in a semiconductor layer of a switching element, a driver circuit portion 506 and a pixel portion 507 can be formed on the same substrate due to high mobility of polysilicon.

In such a liquid crystal display device, when forming the transparent conductive film 510 on the opposing substrate, a portion of the transparent conductive film 510 above the driver circuit portion may be removed bay etching such that a parasitic capacitance is not attached to the driver circuit portion.

Further, the conductive film 200 is removed in the driver circuit portion so that the parasitic capacitance may not be formed.

In accordance with Embodiment Mode 3, when a voltage with single polarity is applied to the liquid crystal layer, the transparent conductive film 510 disposed on the opposing substrate is used as one electrode and the conductive film 200 disposed on the element substrate is used as the other electrode. The voltage with single polarity can be applied to the liquid crystal between the two electrodes. The absolute value of the voltage can be freely changed because the voltage with single polarity is applied to the liquid crystal without using a pixel TFT.

In accordance with Embodiment Mode 3, ultraviolet rays are collectively irradiated to the sealing agent of ultraviolet hardening type which seals the injection port and the liquid crystal material, thereby performing both optical hardening processing of the sealing agent and polymer stabilization processing of the liquid crystal material at the same time. The liquid crystal material is exposed to the ultraviolet rays for the first time in the polymer stabilization processing, and therefore, satisfactory polymer stabilization processing can be performed.

Embodiment Mode 4

In Embodiment Mode 4, polymer stabilization processing is performed using the fourth means.

As to the third means, an upper limit on the temperature in the process of forming an element exists due to heat resistance of a conductive film 200 formed on an element substrate. The process temperature of the element substrate can be arbitrarily set by the fourth means.

The fourth means is explained with reference to FIGS. 10 to 14. A dashed line A-A' of FIG. 10 corresponds to the cross section taken along with the dashed line A-A' in a top view of FIG. 14. Dashed lines D-D' and E-E' of FIG. 10 and FIG. 11 correspond to the cross sections taken along with the dashed lines D-D' and E-E' in a top view of FIG. 12, respectively. The same components are indicated by the same reference numerals in FIGS. 10 to 12 and FIG. 14. FIG. 13 is a flowchart in the polymer stabilization. The manufacturing process of the element substrate and the liquid crystal display device of FIGS. 10 to 14 is described in detail in embodiments.

Figure 10:
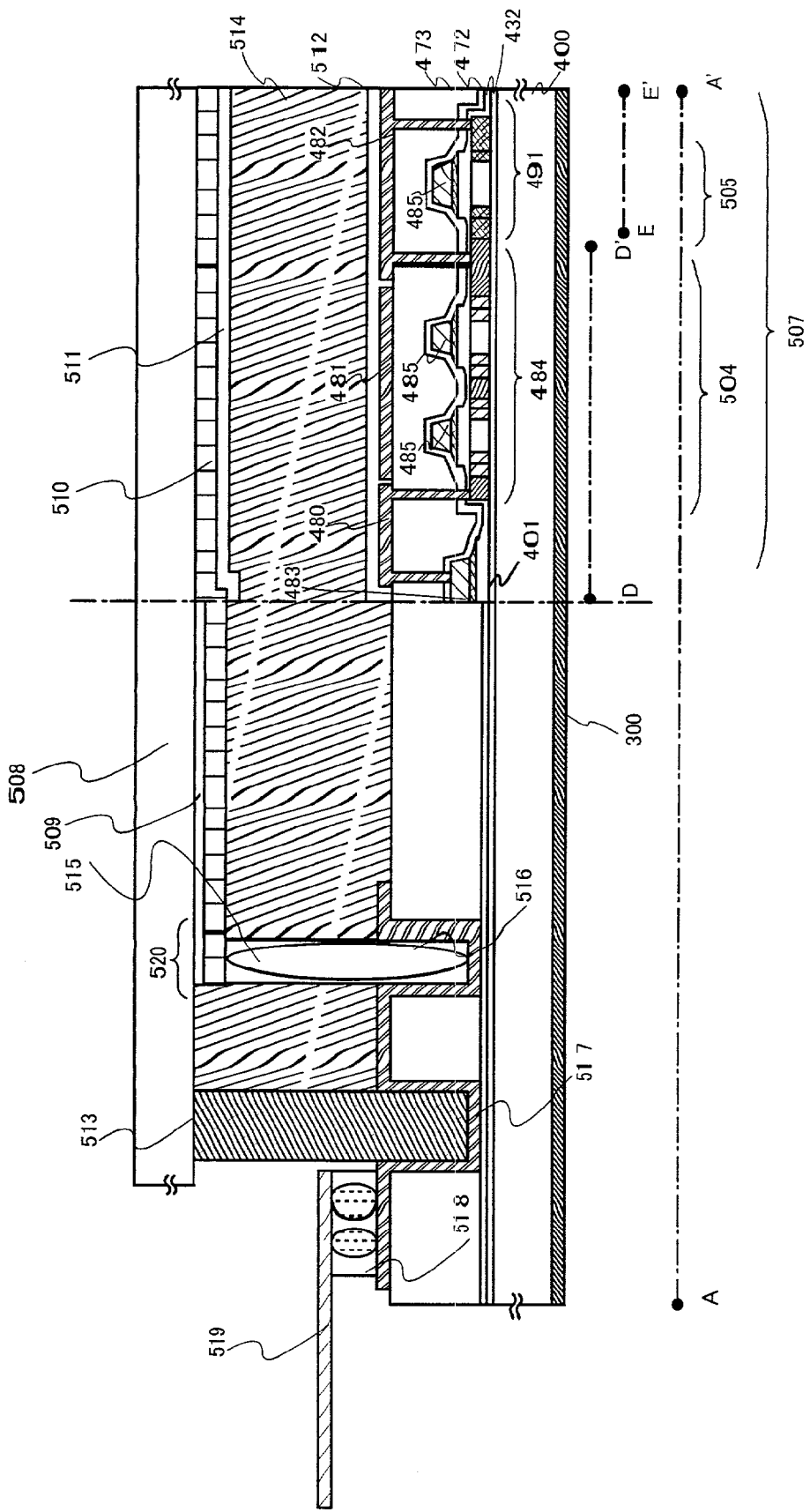
FIG. 10 shows a cross sectional view of a pixel portion and a driver circuit portion of the liquid crystal display device of Embodiment Mode 3.

As shown in FIG. 10, semiconductor layers 484 and 491, a gate insulating film 432, a gate electrode 485 serving also as a capacitor electrode, a first interlayer film 472, a second interlayer film 473, a source wiring 483, and a pixel electrode 482 are formed on the element substrate. A lead wiring 517 for an attachment of a flexible printed circuit is further formed on the element substrate. In case of a transmission type liquid crystal display device, the pixel electrode 482 is formed of a transparent conductive film. In case of a reflection type liquid crystal display device, the pixel electrode 482 is formed of a thin conductive film having a function of reflecting light.

A light shielding film 509 is formed on an opposing substrate 508. Chromium or the like can be used for the light shielding film.

A transparent conductive film 510 is formed on the light shielding film 509. An indium oxide—tin oxide (ITO) film may be used for the transparent conductive film.

Orientation films 511 and 512 are Formed on the element substrate and the opposing substrate. A rubbing process is performed for the orientation films 511 and 512 so that the liquid crystal is made to have parallel orientation.

A common pad 520 of the opposing substrate is formed from a conductive paste. The conductive paste is formed by mixing a conductive spacer 516 into a sealing agent 515. The conductive spacer is formed by coating a surface of a particle spacer with gold powder. The transparent conductive film 510 of the opposing substrate and the lead wiring 517 for the attachment of the flexible printed circuit are electrically connected with each other by the conductive paste.

The sealing agent 515 is used for the conductive paste, but there is a sealing agent that compress only about 2.5 μm depending on the material. Thus, it is difficult to form a cell gap of 1 to 2 μm required for the orientation of the ferroelectric liquid crystal. Therefore, in a region where the conductive paste is formed, the first interlayer film 472 and the second interlayer film 473 are removed by etching, and thus, the cell gap in the pixel portion is preferably made small.

The opposing substrate and the element substrate are bonded together by a sealing agent 513. In a region where the sealing agent 513 is formed, the first interlayer film 472 and the second interlayer film 473 are removed by etching, and thus, the cell gap in the pixel portion is preferably made small.

The opposing substrate and the element substrate are cut.

A liquid crystal material 514 is injected. A mixture of a ferroelectric liquid crystal, a liquid crystal polymer and a polymerization initiator are used as the liquid crystal material 514. For example, Felix M4851/100 of Clariant Corp. is used as the ferroelectric liquid crystal. A liquid crystal acrylate monomer UCL-001 of Dainippon Ink and Chemicals Inc. as the liquid crystal polymer added with the polymerization initiator of 2 to 3 wt. % is used. A small amount (2 wt. %) of the liquid crystal acrylate monomer is added to the ferroelectric liquid crystal.

The flexible printed circuit 518 is attached by an anisotropic conductive film 519. A conductive sheet 300 and the flexible printed circuit are connected to a direct-current power supply, and a direct voltage is applied between the transparent conductive film 510 disposed on the opposing substrate 508 and the conductive sheet 300. The conductive sheet 300 may be formed on a substrate 400 by film deposition. A metal plate may be formed so as to contact the substrate 400. Further, a tape having both conductivity and viscosity may be formed on the substrate 400.

A conductive tape formed by laminating an adhesive layer and a conductive layer may be used as the tape having both conductivity and viscosity.

The direct voltage value of the power supply is changed based on the relative dielectric constant of the liquid crystal material, the glass thickness of the element substrate, the voltage applied to the liquid crystal layer, and the like. The direct voltage value of the power supply is determined by the following expression.

$$V = V_{LC} + (\in_{rLC} \times V_{LC} \times d_s)/(\in_{rs} \times d_{LC})$$ [Exp. 1]

In Expression 1, V indicates a value of the direct voltage, $V_{LC}$ indicates a voltage applied to the liquid crystal material, $\in_{rLc}$ indicates a relative dielectric constant of the ferroelectric liquid crystal, $d_{LC}$ indicates a cell gap, $\in_{rS}$ indicates a relative dielectric constant of the element substrate, and $d_S$ indicates a thickness of the element substrate.

It is assumed that the cell gap is 2.0 µm, the relative dielectric constant of the glass of the element substrate is 3.0, and the voltage applied to the liquid crystal layer is 5 V. In the liquid crystal material, it is assumed that the relative dielectric constant of the ferroelectric liquid crystal is 10 to 30 and the glass thickness of the element substrate is 300 to 1100 µm. Thus, the direct voltage value of the power supply is 2.5 to 27.5 kV. Most of the direct voltage of the power supply is applied to the glass.

The gas of the element substrate is etched to thin the glass thickness for a thinner liquid crystal display device. Thus, the value of the direct voltage to be applied can be made small.

When ultraviolet rays are irradiated to the entire surface of the substrate in a vertical direction while the direct voltage is applied, monostabilization of the ferroelectric liquid crystal is performed.

After the monostabilization of the ferroelectric liquid crystal is completed, the conductive sheet 300 is peeled from the back surface of the substrate 400.

It is possible not only to use the conductive sheet 300 but also to form a transparent conductive film on the back surface of the element substrate 400. In case of a reflection type liquid crystal display device, a metal electrode having a reflection function may be formed on the back surface of the element substrate.

In the above-described manner, a desired direct voltage can be applied to a desired region. The present invention can be applied irrespective of the temperature of the heating process of the element substrate.

Figure 11:
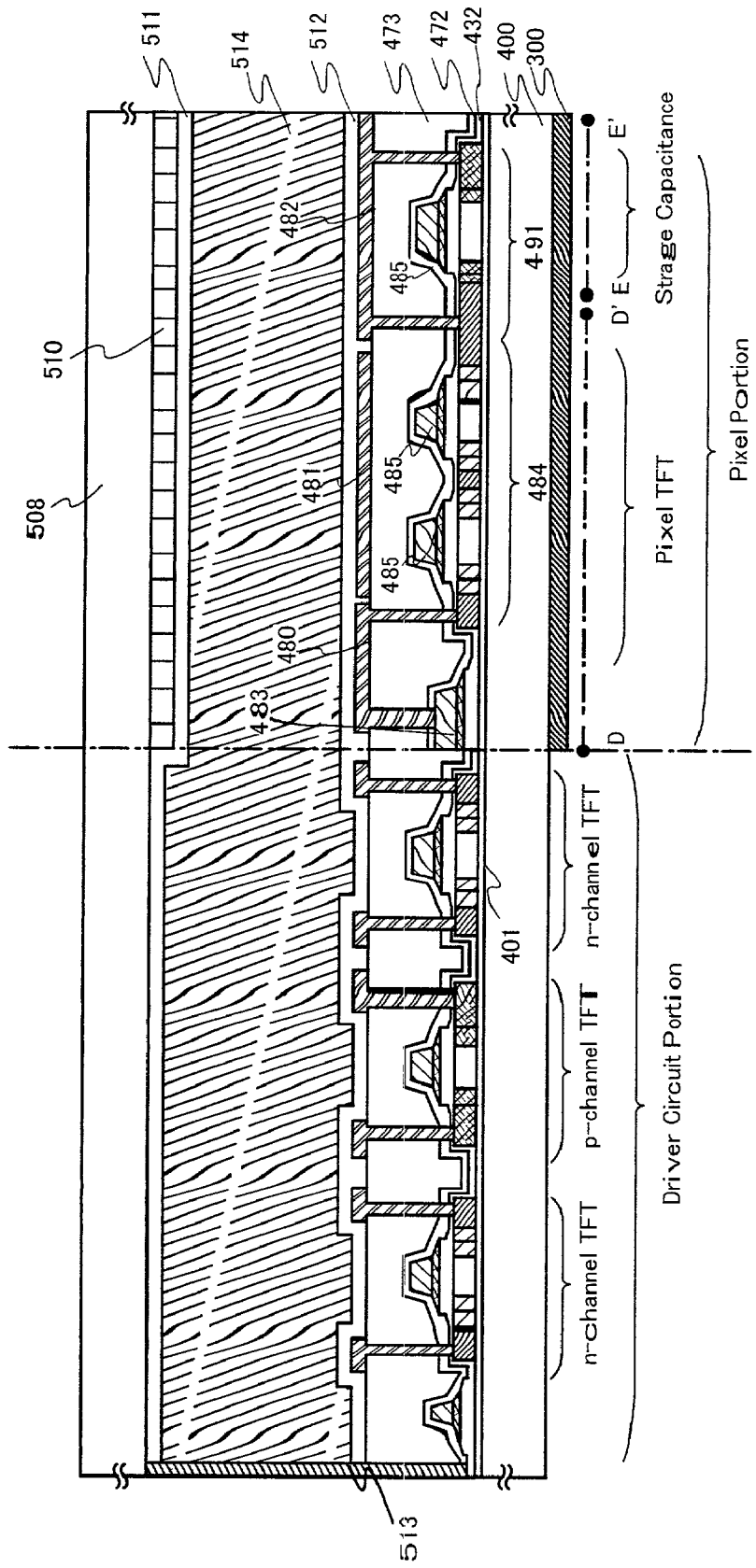
FIG. 11 shows a cross sectional view of a liquid crystal display device of Embodiment 3.

As shown in FIG. 11, in an active matrix liquid crystal display device using polysilicon in a semiconductor layer of a switching element, a driver circuit portion 506 and a pixel portion 507 can be formed on the same substrate due to high mobility of polysilicon.

In such a liquid crystal display device, when forming the transparent conductive film 510 on the opposing substrate 508, a portion of the transparent conductive film 510 above the driver circuit portion may be removed by etching such that a parasitic capacitance is not attached to the driver circuit portion.

Further, in the polymer stabilization, the conductive sheet 300 may be formed on the back surface of the element substrate 400 outside the driver circuit portion.

In accordance with Embodiment Mode 4, when a voltage with single polarity is applied to the liquid crystal layer, the transparent conductive film 510 disposed on the opposing substrate is used as one electrode and the conductive sheet 300 disposed on the back surface of the element substrate is used as the other electrode. Thus, regardless of the temperature in the process of forming an element, an electrode for making the liquid crystal layer monostable can be provided.

EMBODIMENTS

Embodiment 1

(An example of manufacturing method of the element substrate which is used for the reflection type liquid crystal display device.)

FIGS. 15 to 17 and FIG. 8 are used to explain Embodiments of the present invention.

Figure 17:
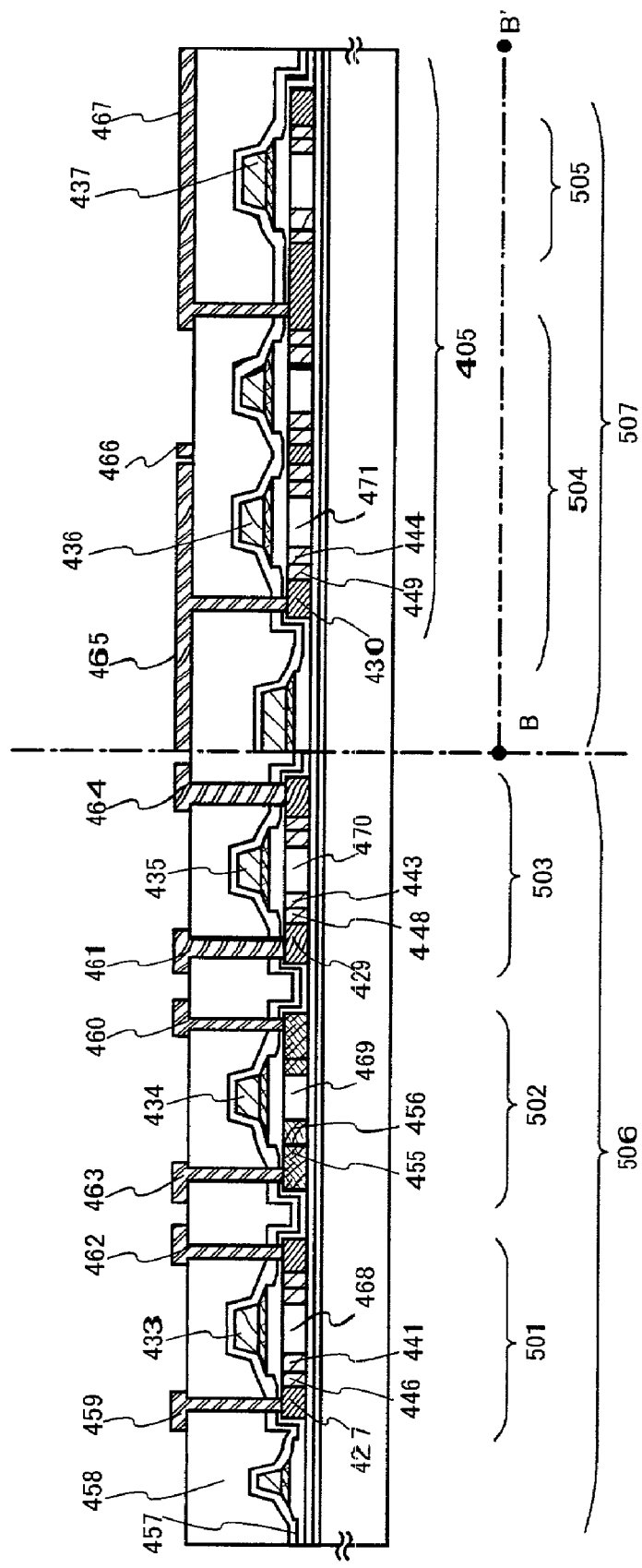
FIG. 17 shows the process of manufacturing the pixel portion and the driver circuit portion of the liquid crystal display device of Embodiment 1.

The cross-sectional structure taken along the line B-B' of FIG. 17 is corresponded to FIG. 8 taken along the line B-B'. In this embodiment, a manufacturing method is explained precisely according to steps which is forming pixel TFT of the pixel portion and the storage capacitor; driver circuit TFT provided in periphery portion of the display region simultaneously.

In this embodiment, a description is set forth regarding a step for fabricating the pixel TFTs, which is switching elements in the pixel portion and TFTs for driver circuit (a signal line driver circuit and a scanning line driver circuit, or the like) provided in peripheral of the pixel portion over a same substrate. For the simplicity of the explanation, a CMOS circuit which is a fundamental structure circuit for the driver circuit portion, and an n-channel TFT for a pixel TFT in a pixel portion are illustrated with the cross section taken along a path.

First, as shown in FIG. 15A, a base film 401 made of an insulating film such as a silicon oxide film, a silicon nitride film, or a silicon oxynitride film, is formed on a substrate 400 made of a glass such as barium borosilicate glass or aluminum borosilicate glass, typically a glass such as Corning Corp. #7059 glass or #1737 glass. For example, a lamination film of a silicon oxynitride films 401a, manufactured from $SiH_4$, $NH_3$, and $N_2O$ by plasma CVD, and formed having a thickness of 10 to 200 nm (preferably between 50 and 100 nm), and a hydrogenated silicon oxynitride film 401b, similarly manufactured from $SiH_4$ and $N_2O$, and formed having a thickness of 50 to 200 nm (preferably between 100 and 150 nm), is formed. A two layer structure is shown for the base film 401 in Embodiment 1, but a single layer film of the insulating film, and a structure in which more than two layers are laminated, may also be formed.

Island shape semiconductor layers 402 to 405 are formed by crystalline semiconductor films made from a semiconductor film having an amorphous structure, using a laser crystallization method or a known thermal crystallization method. The thickness of the island shape semiconductor layers 402 to 405 may be formed from 25 to 80 nm (preferably between 30 and 60 nm). There are no limitations placed on the materials for forming a crystalline semiconductor film, but it is preferable to form the crystalline semiconductor films by silicon or a silicon germanium (SiGe) alloy.

A laser such as a pulse oscillation type or continuous light emission type excimer laser, a YAG laser, or a $YVO_4$ laser can be used to fabricate the crystalline semiconductor films by the laser crystallization method. A method of condensing laser light emitted from a laser oscillator into a linear shape by an optical system and then irradiating the light to the semiconductor film may be used when these types of lasers are used. The crystallization conditions may be suitably selected by the operator, but when using the excimer laser, the pulse oscillation frequency is set to 30 Hz, and the laser energy density is set form 100 to 400 mJ/cm² (typically between 200 and 300 mJ/cm²). Further, when using the YAG laser, the second harmonic is used and the pulse oscillation frequency is set from 1 to 10 kHz, and the laser energy density may be set from 300 to 600 mJ/cm² (typically between 350 and 500 mJ/cm²). The laser light condensed into a linear shape with a width of 100 to 1000 μm, for example 400 μm, is then irradiated over the entire surface of the substrate. This is performed with an overlap ratio of 80 to 98% for the linear laser light.

A gate insulating film 407 is formed covering the island shape semiconductor layers 402 to 405. The gate insulating film 407 is formed of an insulating film containing silicon with a thickness of 40 to 150 nm by plasma CVD or sputtering. A 120 nm thick silicon oxynitride film is formed in Embodiment 1. The gate insulating film is not limited to this type of silicon oxynitride film, of course, and other insulating films containing silicon may also be used in a single layer or in a lamination structure. For example, when using a silicon oxide film, it can be formed by plasma CVD with a mixture of TEOS (tetraethyl orthosilicate) and $O_2$, at a reaction pressure of 40 Pa, with the substrate temperature set from 300 to 400 C., and by discharging at a high frequency (13.56 MHz) electric power density of 0.5 to 0.8 W/cm². Good characteristics as a gate insulating film can be obtained by subsequently performing thermal annealing, at between 400 and 500 C, of the silicon oxide film thus manufactured.

A first conductive film 408 and a second conductive film 409 are then formed on the gate insulating film 407 in order to form gate electrodes. The first conductive film 408 is formed of a TaN film with a thickness of 50 to 100 nm, and the second conductive film 409 is formed of a W film having a thickness of 100 to 300 nm, in Embodiment 1.

The W film is formed by sputtering with a W target, which can also be formed by thermal CVD using tungsten hexafluoride ($WF_6$). Whichever is used, it is necessary to make the film become low resistance in order to use it as the gate electrode, and it is preferable that the resistivity of the W film be made equal to or less than 20 μΩcm. The resistivity can be lowered by enlarging the crystal grains of the W film, but for cases in which there are many impurity elements such as oxygen within the W film, crystallization is inhibited, thereby the film becomes high resistance. A W target having a purity of 99.9999% is thus used in sputtering. In addition, by forming the W film while taking sufficient care that no impurities from the gas phase are introduced at the time of film formation, the resistivity of 9 to 20 μΩcm can be achieved.

Note that, although the first conductive film 408 is a TaN film and the second conductive film 409 is a W film in Embodiment 1, both may also be formed from an element selected from the group consisting of Ta, W, Ti, Mo, Al, and Cu, or from an alloy material having one of these elements as its main constituent, and a chemical compound material. Further, a semiconductor film, typically a polycrystalline silicon film into which an impurity element such as phosphorus is doped, may also be used. Examples of preferable combinations other than that used in Embodiment 1 include: forming the first conductive film by tantalum nitride (TaN) and combining it with the second conductive film formed from a W film; forming the first conductive film by tantalum nitride (TaN) and combining it with the second conductive film formed from an Al film; and forming the first conductive film by tantalum nitride (TaN) and combining it with the second conductive film formed from a Cu film. Whichever is used, it is preferable to combine the conductive materials which can be etched with the suitable selectivity.

Then, masks 410 to 415 are formed from resist, a resist 417 and a first etching treatment is performed in order to form electrodes and wirings. An ICP (inductively coupled plasma) etching method is used in Embodiment 1. An etching gas is mixed, and a plasma is generated by applying a 500 W RF electric power (13.56 MHz) to a coil shape electrode at 1 Pa. A 100 W RF electric power (13.56 MHz) is also applied to the substrate side (test piece stage), effectively applying a negative self-bias voltage. Selecting appropriately etching gas, the W film and the TaN film are etched to the approximately same level.

Edge portions of the first conductive layer and the second conductive layer are made into a tapered shape in accordance with the effect of the bias voltage applied to the substrate side under the above etching conditions by using a suitable resist mask shape. The angle of the tapered portions is from 15 to 45°. The etching time may be increased by approximately 10 to 20% in order to perform etching without any residue remaining on the gate insulating film. The selectivity of a silicon oxynitride film with respect to a W film is from 2 to 4 (typically 3), and therefore approximately 20 to 50 nm of the exposed surface of the silicon oxynitride film is etched by this over-etching process. First shape conductive layers 419 to 425 (first conductive layers 419a to 425a and second conductive layers 419b to 425b) are thus formed of the first conductive layers and the second conductive layers in accordance with the first etching process. Reference numeral 418 denotes a gate insulating film, and the regions not covered by the first shape conductive layers 419 to 425 are made thinner by etching of about 20 to 50 nm.

A first doping process is then performed, and an impurity element which imparts n-type conductivity is added. (FIG. 15B) Ion doping or ion injection may be performed for the method of doping. Ion doping is performed under the conditions of a dose amount of from $1\times10^{13}$ to $5\times10^{14}$ atoms/cm² and an acceleration voltage of 60 to 100 keV. A periodic table group 15 element, typically phosphorus (P) or arsenic (As) is used as the impurity element which imparts n-type conductivity, and phosphorus (P) is used here. The conductive layers 419 to 423 become masks with respect to the n-type conductivity imparting impurity element in this case, and first impurity regions 427 to 431 are formed in a self-aligning manner. The impurity element which imparts n-type conductivity is added to the first impurity regions 427 to 431 with a concentration in the range of $1\times10^{20}$ to $1\times10^{21}$ atoms/cm³.

A second etching process is performed next, as shown in FIG. 15C. The ICP etching method is similarly used. A plasma is generated by introducing a reaction gas to a chamber and a supplying a predetermined RF electric power (13.56 MHz) to a coil shape electrode. Low RF electric power (13.56 MHz) is applied to the substrate side (test piece stage), and a self-bias voltage which is lower in comparison to that of the first etching process is applied. The W film is etched anisotropically forming second shape conductive layers 494 to 498.

A second doping process is then performed, as shown in FIG. 15C. The dose amount is made smaller than that of the first doping process in this case, and an impurity element which imparts n-type conductivity is doped under high acceleration voltage conditions. For example, doping is performed with the acceleration voltage set from 70 to 120 keV, and a dose amount of $1\times10^{13}$ /cm², and a new impurity region is formed inside the first impurity region formed in the island shape semiconductor layers of FIG. 15B. The second conductive layers 494 to 498 are used as masks with respect to the impurity element, and doping is performed so as to also add the impurity element into regions under the first conductive layers 494a to 498a. Second impurity regions 608 to 612 that overlap the first conductive layers 494a to 498a. The impurity element which imparts n-type conductivity is added such that the concentration becomes from $1\times10^{17}$ to $1\times10^{18}$ atoms/cm$^3$ in the second impurity regions.

As shown in FIG. 16A, the first conductive layer, TaN, is backward and also etched by etching the gate insulating film 432. Third shape conductive layers 433 to 438 (first conductive layers 433a to 438a and second conductive layers 433b to 438b) are formed. Reference numeral 432 denotes a gate insulating film, and the regions not covered by the third shape conductive layers 433 to 438 are made thinner by etching of about 20 to 50 nm.

In FIG. 16A, third impurity region 441 to 444 which is overlapped with the conductive layers 433a to 437a and fourth impurity region 446 to 449 which is outside the third impurity region. Therefore the concentration of an impurity element which imparts n-type conductivity into third impurity region and fourth impurity region is equal to an impurity element in second impurity region approximately.

Fifth impurity region 456 and sixth impurity region 457 added with an impurity element having a conductivity type which is the opposite of the above conductive type impurity element, are then formed as shown in FIG. 16B in the island shape semiconductor layers 403 which form p-channel TFTs. Third shape conductive layer 414 is used as a mask with respect to the impurity element, and the impurity regions are formed in a self-aligning manner. The island shape semiconductor layers 402, 404 and 405, which form n-channel TFTs, are covered over their entire surface areas by resist masks 451 to 453. Phosphorus is added to the fifth and sixth impurity regions 456 and 455 at a different concentration, and ion doping is performed here using diborane ($B_2H_6$), so that the respective impurity regions have the impurity concentration of $2\times10^{20}$ to $2\times10^{21}$ atoms/cm$^3$.

Impurity regions are formed in the respective island shape semiconductor layers by the above processes. The conductive layers 433 to 436 overlapping the island shape semiconductor layer function as gate electrodes of TFT. Further, reference numeral 437 denotes a capacitor wiring and 438 denotes a wiring of a driver circuit.

A capacitor wiring 437 is formed extended over pixels, there are storage capacitor forming region which is overlapped with an island semiconductor layer 405 and region functioning wiring to connect the storage capacitor each other.

A process of activating the impurity elements added to the respective island shape semiconductor layers is then performed, as shown in FIG. 16C, with the aim of controlling conductivity type. Thermal annealing using an annealing furnace is performed for this process. In addition, laser annealing and rapid thermal annealing (RTA) can also be applied. Thermal annealing is performed with an oxygen concentration equal to or less than 1 ppm, preferably equal to or less than 0.1 ppm, in a nitrogen atmosphere at 400 to 700° C., typically between 500 and 600° C. Heat treatment is performed for 4 hours at 500° C. in Embodiment 1. However, for cases in which the wiring material used in the wirings 433 to 440 is weak with respect to heat, it is preferable to perform activation after forming an interlayer insulating film (having silicon as its main constituent) in order to protect the wirings and the like.

In addition, heat treatment is performed for 1 to 12 hours at 300 to 450 C in an atmosphere containing between 3 and 100% hydrogen, performing hydrogenation of the island shape semiconductor layers. This process is one of terminating dangling bonds in the island shape semiconductor layers by hydrogen which is thermally excited. Plasma hydrogenation (using hydrogen excited by a plasma) may also be performed as another means of hydrogenation.

A first interlayer insulating film 457 is formed next of a silicon oxynitride film having a thickness of 100 to 200 nm as FIG. 17. A second interlayer insulating film 458 made of an organic insulating material is then formed on the first interlayer insulating film 457. Etching is then performed in order to form contact holes.

Then, source wirings 459 to 461 for forming contacts with source regions, and source wirings 459 to 461 for forming contacts with source regions, of the island shape semiconductor layers in a driver circuit portion are then formed. Further, in a pixel portion, a source wiring 465 and pixel electrodes 466, 467 are formed. The drain electrode 466 is formed in adjacent pixel. The drain electrode functions as a pixel electrode of reflection is type liquid crystal display device. The line B-B' FIG. 17 corresponds to cutting line B-B' of top surface figure of FIG. 8.

An electrical connection is made between the drain electrode 465 and the island like semiconductor layer 405 corresponding to an active layer of a pixel TFT, also between the drain electrode 467 and the island semiconductor layer 405 forming storage capacitor 505.

The driver circuit portion having an n-channel TFT 501, a p-channel TFT 502, and a driving circuit portion 506 having an n-channel TFT 503; and a pixel portion 507 having a pixel TFT 504 and a storage capacitor 505 can thus be formed on the same substrate. For convenience, this type of substrate is referred to as an active matrix substrate throughout this specification.

The n-channel TFT 501 of the driver circuit portion has a channel forming region 468; the third impurity region 441 (GOLD region) overlapping the conductive layer 433, which forms a gate electrode; the fourth impurity region 446 (LDD region) formed outside the gate electrode; and the first impurity region 427 which functioning as a source region or a drain region. The p-channel TFT 502 has a channel forming region 469; the fifth impurity region 456 overlapping the conductive layer 434, which forms a gate electrode; the sixth impurity region 455 which functions as a source region or a drain region. The n-channel TFT 503 has a channel forming region 470; the third impurity region 443 (GOLD region) overlapping the conductive layer 435, which forms a gate electrode; the fourth impurity region 448 (LDD region) formed outside the gate electrode, and the first impurity region 429 which functions as a source region or a drain region.

The pixel TFT 504 of the pixel portion has a channel forming region 471; the third impurity region 444 (GOLD region) overlapping the conductive layer 436, which forms a gate electrode; the fourth impurity region 449 (LDD region) formed outside the gate electrode; and the first impurity region 430 which functions as a source region or a drain region. Further, an impurity element which imparts n-type conductivity is added: to the semiconductor layer 405, which functions as one electrode of the storage capacitor 505. The storage capacitor is formed by the capacitor wiring 437, and an insulating layer therebetween (the same layer as the gate insulating film).

Furthermore, in accordance with the processes shown in Embodiment 1, the active matrix substrate can be manufactured by using five photomasks (an island shape semiconductor layer pattern, a first wiring pattern (gate wiring, capacitor wirings), a second wiring pattern (source wiring, drain electrode), contact hole pattern, mask pattern of n-channel region. As a result, the processes can be reduced, and this contributes to a reduction in the manufacturing costs and an increase in throughput.

As shown in top surface figure of FIG. 8, for driving liquid such as a ferroelectric mixed liquid crystal having a spontaneous polarization, a large storage capacitor is necessary. If a reflection type liquid crystal display device is used as this embodiment, a large storage capacitor 505 can be retained with no loss of characteristics in the aperture ratio.

Embodiment 2

(An example of a manufacturing process of an element substrate used for a reflective type liquid crystal display device)

Figure 12:
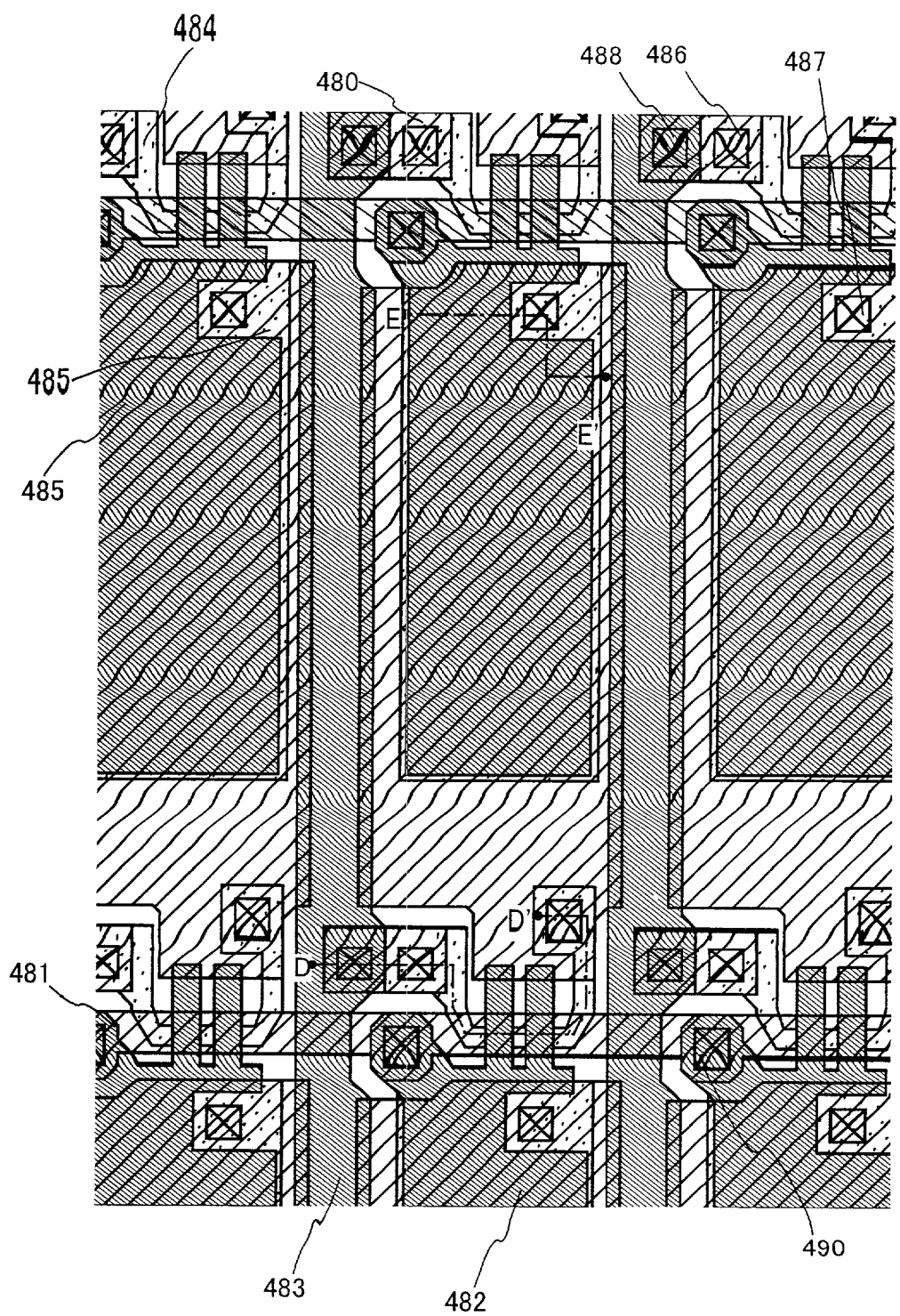
FIG. 12 shows a top surface diagram of a pixel portion of a liquid crystal display device of Embodiment 2.
Figure 13:
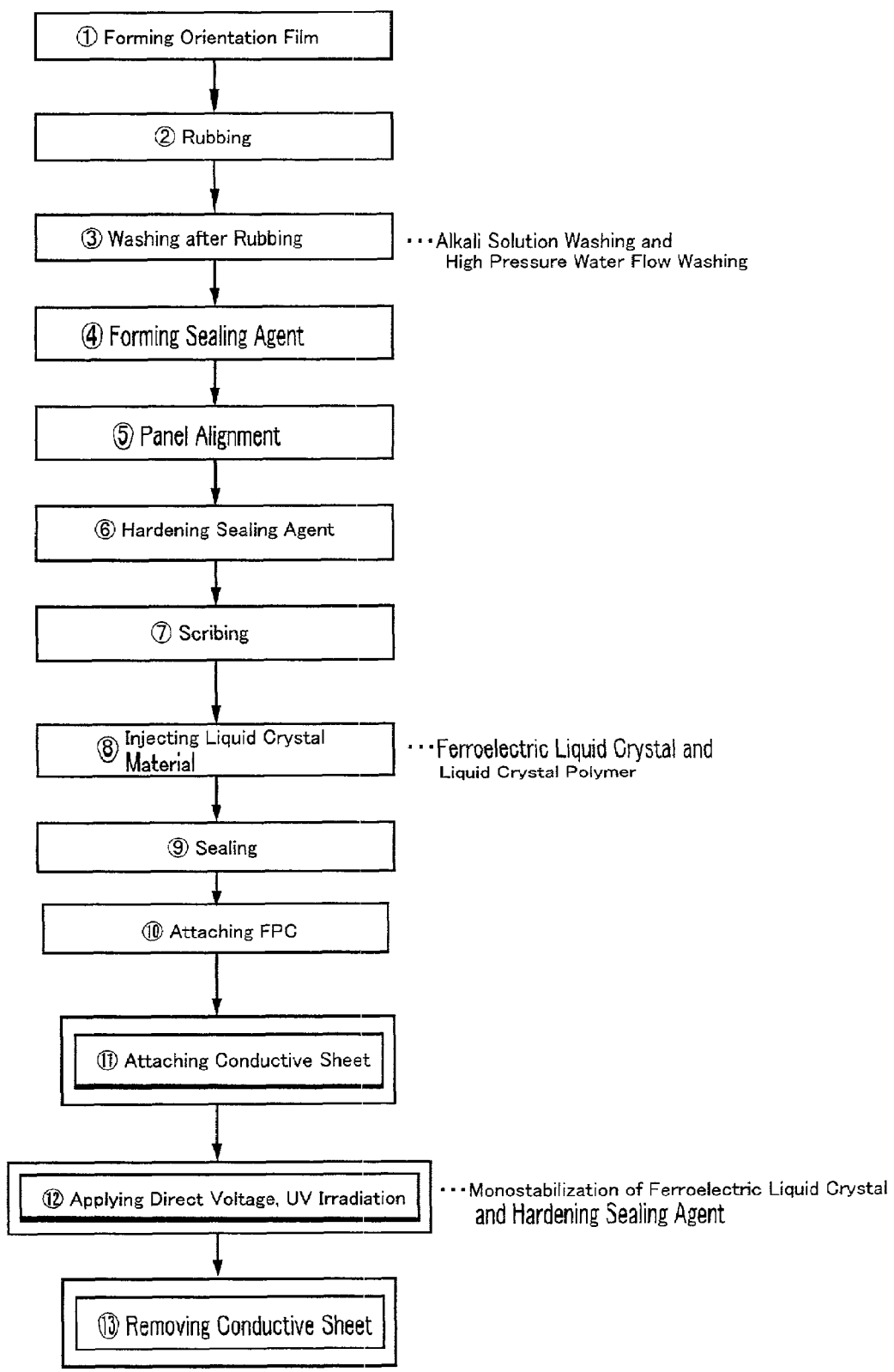
FIG. 13 shows the processing order when performing polymer stabilization processing.
Figure 18:
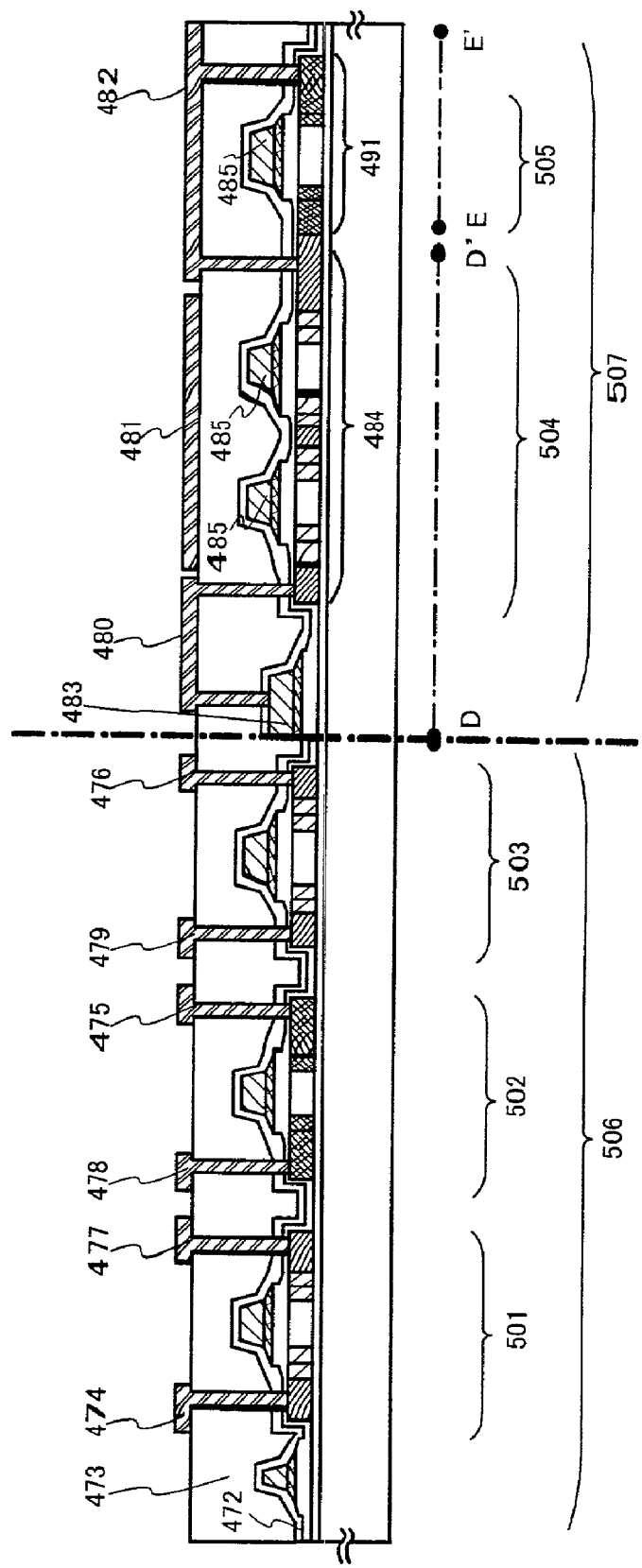
FIG. 18 shows a cross sectional view of a process of manufacturing the pixel portion and a driver circuit portion of the liquid crystal display device of Embodiment 2.

This embodiment is explained referring to FIGS. 12 and 18. The dashed lines D-D' and E-E' of FIG. 18 show the cross section along the dashed lines D-D' and E-E' of FIG. 12. FIG. 18 shows the manufacturing of the substrate fabricated in the processes of FIGS. 15A to 16C of Embodiment 1, added with the following processes. The layout of the pixel portion shown in the top view of FIG. 12 is formed so as to overlap the pixel electrode with the source wiring so that the aperture ratio is larger compared with Embodiment 1 (FIG. 8).

Note that, the difference from FIG. 16C is in that as shown in the cross sectional view of FIG. 18, since an electrode to apply a negative voltage in most of a one frame such as a gate electrode 485 is used as the first electrode of the storage capacitance 505, a p-type impurity is added to a second semiconductor layer 491 used as a second electrode of a storage capacitance.

The manufacturing process of an element substrate is explained with reference to the cross sectional view of FIG. 18. First, the first interlayer insulating film 472 is formed by a silicon nitride oxide film with a thickness of 100 to 200 nm. On the silicon nitride oxide film is formed a second interlayer insulating film 473 formed of an organic insulating material. Next, an etching process for forming a contact hole is formed.

Then, source wirings 474 to 476 forming the source region and the contact of the island shape semiconductor layer, and the drain wirings 477 to 479 forming the drain region and the contact are formed in the driver circuit portion.

Further, in the pixel portion, a connection electrode 480, a gate wiring 481, and a drain electrode 482 are formed. The film thickness is preferably 0.3 μm to 0.75 μm. The drain electrode 482 functions as the pixel electrode of the reflection type liquid crystal display device.

The connecting electrode 480 electrically connects the source wiring 483 and the first semiconductor layer 484. Although not shown, the gate wiring 481 is electrically connected to the gate electrode 485 by the contact hole. The drain electrode 482 is electrically connected to the second semiconductor layer 491 and functions as the electrode of the storage capacitance 505.

As described above, by adding a process to the element substrate shown in the cross sectional view of FIG. 16C, a driver circuit portion comprising an n-channel TFT 501, a p-channel TFT 502, and an n-channel TFT 503, and a pixel portion comprising a pixel TFT 504 and a storage capacitance 505 may be formed on the same substrate. In this specification, such a substrate is called an active matrix substrate for the sake of convenience.

An element substrate is explained in the top view of FIG. 12. As shown in FIG. 12, the element substrate contains a gate wiring arranged in the row direction, a source wiring 483 arranged in the column direction, a pixel portion having a pixel TFT near the intersection portion of the gate wiring and the source wiring, and the driver circuit having the n-channel TFT and the p-channel TFT.

However, the gate wiring shown in FIG. 12 refers to the gate wiring connected by the gate electrode 485 arranged in the row direction and the gate wiring 481. Further, the gate wiring 485 is provided on and contacting the second interlayer insulating film (not shown).

The first semiconductor layer 484 and the second semiconductor layer 491 are patterned. The first semiconductor layer 484 is an active layer of the TFT element. The second semiconductor layer 491 functions as the storage electrode of a storage capacitor described later.

The source wiring 483 and the gate electrode 485 are formed so as to contact the gate insulating film (not shown).

After forming the first interlayer insulating film and the second interlayer insulating film (not shown), contact holes 486 to 490 which reach the first semiconductor layer 484, the second semiconductor layer 491 and the source wiring 483 are opened. Next, by patterning, a connecting electrode 490, a drain electrode 492 and a gate wiring 485 are formed.

By the contact holes 486 and 488, through the connecting electrode 480, the first semiconductor layer 484 and the source wiring 483 are electrically connected.

By the contact hole 489, the first semiconductor layer 484 and the drain electrode 482 are electrically connected.

By the contact hole 487, the second semiconductor layer 491 and the drain electrode 482 are electrically connected. As a result, the drain electrode 482 applies a potential to the 491 which functions as the electrode of the storage capacitance. The storage capacitance is formed by the gate electrodes 485 and 491. The gate insulating film functions as the insulating film of the storage capacitance.

By the contact hole 490, the gate electrode 485 and the gate wiring 481 are electrically connected.

By the manufacturing process of the element substrate of Embodiment 1 and this embodiment, the number of masks necessary for forming the element substrate having a pixel portion with the pixel structure, and the driver circuit shown in FIGS. 18 and 12, may be five.

Namely, the first mask is for patterning the first semiconductor layer 484 and the second semiconductor layer 491, the second mask is for patterning the source wiring 483 and the gate electrode 485, the third mask is the mask pattern for the n-channel region, the fourth mask is for forming the respective contact holes reaching to the first semiconductor layer 484, the second semiconductor layer 491, the source wiring 483 and the gate electrode 485, and the fifth mask is for patterning the connecting electrode 480, the drain electrode 482, and the gate wiring 481.

This embodiment shows the manufacturing processes of the reflection type liquid crystal display device. As shown in the top view of FIG. 12, since the pixel electrode having the function of the drain electrode may be formed to overlap the source wiring 483, the aperture ratio may be increased. Also, since the reflection type liquid crystal display device may shorten the distance between pixel electrodes compared with the transparent type liquid crystal display device, the outline of the pixel is not conspicuous.

Embodiment 3

(An example of manufacturing method of the element substrate used for the transmission type liquid crystal display device.) The active matrix substrate manufactured in Embodiments 1 to 2 is applicable for a reflection type display device as it is. On the other hand, in the case of applying it to a transmission type liquid crystal display devices it is appropriate to form the pixel electrodes provided in each pixel of the pixel portion with transparent electrodes. A method of manufacturing an active matrix substrate corresponding to the transmission type liquid crystal display device is explained in with references to FIG. 19.

The active matrix substrate is manufactured in the same way as Embodiment 1. In FIG. 19A, a conductive metallic film is formed by sputtering or vacuum evaporation to form a source wiring and a drain wiring. A Ti film is formed at the thickness between 50 and 150 nm, and then a contact is formed with a semiconductor film that forms the source or the drain region in an island semiconductor layer. Next an aluminum (Al) film is formed at a thickness of between 300 and 400 nm overlapping on the Ti film. Further, a Ti film or a titanium nitride (TiN) film is formed at a thickness of between 100 to 200 nm to thereby form a three-layer structure. Then a transparent conductive film is formed on the entire surface. A pixel electrode 491 is formed by a patterning process and an etching process, using a photomask. The pixel electrode 491 is formed on a second interlayer insulating film 458 sets aside a portion for overlapping with the drain wiring 492 of the pixel TFT in order to form an electrical connection. A pixel electrode 493 of adjacent pixel is also shown in the figure.

FIG. 19B is an example of first forming a transparent conductive film on the second interlayer insulating film 458, performing a patterning process and an etching process to form a pixel electrode 491, and then forming a drain wiring 492 by a portion that overlaps with the pixel electrode 491. The drain wiring 492 is provided by forming a Ti film at a thickness of between 50 and 150 nm, forming a contact hole with a semiconductor film that forms the source or the drain region in an island semiconductor layer, and then forming an aluminum film at a thickness of between 300 and 400 nm overlapping on the Ti film. With this structure, the pixel electrode 491 is in contact only with the Ti film that forms the drain be wiring 492. Consequently, the transparent conductive film material and Al reacting from direct contact can definitely be prevented. A pixel electrode 493 of adjacent pixel is also shown in the figure.

Materials such as indium oxide ($In_2O_3$), or an indium oxide/tin oxide alloy ($In_2O_3$—$SnO_2$; ITO) formed by sputtering or vacuum evaporation may be used as materials for the transparent conductive film. The etching treatment of these materials is performed with hydrochloric acid solutions. However, in particular, the etching of ITO readily generates residues. Therefore, an indium oxide zinc oxide alloy ($In_2O_3$—ZnO) may be used in order to improve the etching workability. The indium oxide/zinc oxide alloy has excellent flat and smooth surface properties, and also has excellent thermal stability with regard to ITO. Accordingly, corrosion reaction with Al at an edge surface of a drain wiring 492 can be prevented. Similarly, zinc oxide (ZnO) is also a suitable material. In order to further improve the transmissivity of visible light and conductivity, zinc oxide (ZnO; Ga) doped with gallium (Ga) or the like may be used.

As set forth above, an active matrix substrate corresponding to the transmission type liquid crystal display device can thus completed. Though the steps of described in this embodiment arc similar to those in Embodiment 1, this kind of structure can be applied to the active matrix substrate shown in Embodiment 2.

Accordingly, an n-channel type TFT 501, a p-channel type TFT 502, driving portion 506 having an n-channel type TFT 503, a pixel TFT 504 and a pixel portion 507 having a storage capacitor 505 are formed on the same substrate, Embodiment 4

(An Example of a Method of Manufacturing a Liquid Crystal Display Device)

This embodiment shows a method of manufacturing a reflection type liquid crystal display device using the element substrate manufactured in Embodiment 2. This embodiment is described referring to FIG. 11. Dashed lines D-D' and E-E' in a cross sectional view of FIG. 11 correspond to the top view of FIG. 12 cut along with the dashed lines D-D' and E-E'.

As a substrate 400 of the element substrate of FIG. 11, quartz may be used. Since transmissivity of ultraviolet rays of quartz may be set to 92% as in the case of visible light, when performing monostabilization by ultraviolet rays irradiation described later, there is little absorption of irradiation light.

On an opposing substrate 508, there is formed a light shielding film (not shown) for obtaining a good black level. As the light shielding film (not shown), chromium or the like may be used.

A transparent conductive film 510 is formed on the light shielding film. As the transparent conductive film, an ITO film may be used. The transparent conductive film 510 is formed in the pixel portion. The orientation of the ferroelectric liquid crystal is affected by the surface smoothness of the transparent conductive film 510, so that it is necessary to select the optimum film formation temperature, film thickness, and material. The above configuration is referred to as the opposing substrate.

The orientation films 511 and 512 are formed on the opposing substrate and the element substrate. The orientation film RN 1286 of Nissan Chemical Industries Ltd. is formed, and prebaked for 5 minutes at 90° C., then post baked for one hour at 250° C. The film thickness after the post baking is 40 nm. The method of forming the orientation film may be a flexographic printing method or a spinner application method. Since RN 1286 does not have good adhesiveness with the sealing agent, at the position where the sealing agent is arranged, the orientation film is removed. Further, the orientation film is not formed on the contact pad electrically connecting the element substrate and the opposing substrate, or on the lead wiring connecting the flexible printed circuit.

The orientation films 511 and 512 are performed with rubbing. The rubbing direction when the opposing substrate and the element substrate are adhered together is made to be parallel. In the rubbing process, as the rubbing cloth, YA-20R of Yoshikawa Kagaku Kogyo Co. Ltd. is used. With the rubbing device of Joyo Engineering Co., Ltd., the pushed in amount is 0.25 mm, the roll revolution is 100 rpm, the stage speed is 10 mm/sec and the number of rubbing is once. The diameter of the rubbing roll is 130 mm. 0193-0199

After the rubbing, the orientation film is cleaned. First, the film is soaked in an alkaline developer for 60 seconds. As the alkaline solution, an MIF developer of Fuji Film Olin Corp. with tetra methyl ammonium hydroxide at a concentration of 5.48% is diluted by 1/20 and used.

Thereafter, a high pressure water flow of 50 to 100 kgf/$cm^2$ is irradiated to the substrate surface to wash the orientation film.

For the washing of the orientation film, by using a combination of the washing by an alkaline solution and the washing by a high pressure water flow, a good orientation is obtained.

Next, a sealing agent 513 is formed. The sealing agent may be a pattern to provide an inlet in one place and perform injection in a vacuum atmosphere. Alternatively, a pattern where a gap to exhaust air is provided between the side with an inlet of the liquid crystal material and an opposing side, and a liquid crystal material is injected under normal pressure may be used.

In this embodiment, in order to enable injection of a liquid crystal material using the capillary action under normal pressure, in the pattern of the sealing agent is provided an inlet for injecting the liquid crystal and the gap for exhausting air.

The sealing agent is formed on the opposing substrate by a seal dispenser of Hitachi Chemical Co., Ltd. As the sealing agent, XN-21S of Mitsui Chemicals, Inc. is used. The prebaking of the sealing agent is performed for 30 minutes at 90° C., and thereafter slowly cooled for 15 minutes.

It is known that even if the sealing agent XN-21S is heat pressed, only a cell gap of 2.3 to 2.6 μm can be obtained. Therefore, in order to form a cell gap of 1.0 μm, it is preferable that a region with a laminating Film of 1.5 μm or more as compared with the pixel portion is provided to arrange the sealing agent. In this embodiment, the sealing agent 513 is arranged in the region where the first interlayer insulating film 472 and the second interlayer insulating film 473 are removed by etching.

Simultaneously with the formation of the sealing agent, the conductive spacer (not shown) is formed.

A spacer (not shown) is formed in the opposing substrate or the element substrate. The spacer may be dispersed with spherical beads. Alternatively, a photosensitive resin may be patterned in a dotted shape or a stripe shape in the display region. The liquid crystal material is made so as not to cause a fault in orientation.

In accordance with the relationship of retardation, the reflection type liquid crystal display device has preferably a cell gap of 0.5 to 1.5 μm. In this embodiment, the cell gap in the pixel portion is made 1.0 μm.

Thereafter, by a pasting device of Newton Corp., the markers of the opposing substrate and the element substrate are matched to perform pasting.

Next, a pressure of 0.3 to 1.0 kgf/cm$^2$ is applied in a direction perpendicular to the substrate plane and to the entire surface of the substrate, and heat curing is performed in a clean oven for 160° C. for 3 hours. A sealing agent is hardened, and the opposing substrate and the element substrate are bonded.

A pair of substrates formed by pasting the opposing substrate and the element substrate are split.

As a liquid crystal material 514, a mixture of a ferroelectric liquid crystal, a liquid crystal polymer and a polymerization initiator is used. As a liquid crystal polymer material, a liquid crystal acrylate monomer-UCL-001 added with a light polymerizing agent of Dainippon Ink and Chemicals Inc. is used. As a ferroelectric liquid crystal, a Felix M4851/100 of Clariant Ltd is used. A liquid crystal acrylate monomer added with a polymerization initiator is mixed in a 2 wt % ferroelectric liquid crystal, and stirred for 20 minutes by a stirrer in an isotropic phase of 80° C.

The liquid crystal material stirred and mixed together, are heated to be an isotropic phase where viscosity is low and is easy for injection, and is injected in a gap between liquid crystal panel substrates formed of an element substrate and an opposing substrate which are fixed by a sealing agent.

The liquid crystal material is heated to an isotropic phase (80° C.) and injected. The liquid crystal panel is heated at 80° C. on a hot plate, and a mixture of ferroelectric liquid crystal and liquid crystal acrylate monomer is injected. After injecting a liquid crystal material on the entire surface of the liquid crystal panel, the liquid crystal is carried to the clean oven, heated for 30 minutes at 80° C., and slowly cooled at 0.1° C./min to room temperature.

As a sealing agent an ultraviolet hardening resin (not shown) is applied by a small A dispenser to cover the inlet. Since it can be assumed that when ultraviolet rays are irradiated in order to harden the ultraviolet hardening resin, ultraviolet rays are transmitted through quartz, unnecessary polymer stabilization may be performed to the liquid crystal material, ultraviolet hardening resin is not hardened at this stage.

The flexible printed circuit (not shown) is adhered by the anisotropic conductive film (not shown).

Lastly, according to any one of the methods of Embodiments 5 to 7, a polymer stabilization process is performed by applying a direct current. In the processes of this embodiment, when ultraviolet rays are irradiated, a monostabilization of the ferroelectric liquid crystal is performed, and at the same time the ultraviolet hardening of the sealing agent is completed.

If a pixel electrode on an element substrate is prepared with a transparent conductive film, by the process of this embodiment, a transmission type liquid crystal display device may be manufactured. The transmission type liquid crystal display device preferably has a cell gap of 1.0 to 2.5 μm considering the retardation and in order to suppress the helical structure of the ferroelectric liquid crystal.

According to this embodiment, ultraviolet rays are irradiated together to the sealing agent of the ultraviolet hardening type which seals the inlet and the liquid crystal material, and a light hardening process of a sealing agent and a polymer stabilization process of a liquid crystal material are performed at the same time. Since the liquid crystal is to be exposed to ultraviolet rays for the first time in the polymer stabilization process, a good polymer stabilization process may be performed.

Embodiment 5

(An Example of a Method of Polymer Stabilization Processing)

In a reflection type liquid crystal display device or a transmission type liquid crystal fig display device, a method of monostabilizing the ferroelectric liquid crystal by liquid crystal polymer is shown below. This embodiment is described referring to FIGS. 1 and 5.

After adhering the flexible printed circuit to the liquid crystal display device, a gate start pulse 114 and a gate clock pulse 104 shown in FIG. 1 are input to the gate driver from the outside. The gate start pulse 114 always holds a constant level while the ferroelectric liquid crystal is being monostabilized. As a result, the voltage value of the gate pulse 115 is always at a constant level while monostabilizing the ferroelectric liquid crystal, and a charge is always supplied to the liquid crystal layer.

As a result, the voltage 116 applied to the liquid crystal layer has a constant Voltage. As compared to when the liquid crystal layer is made to respond due to the electric field in line sequential driving, since a charge is always applied, the voltage level of the liquid crystal layer may be maintained constant.

Namely, when an electric field is applied to the liquid crystal layer in line sequential driving, due to the leak of current in the liquid crystal cell and the storage capacitance the voltage applied to the liquid crystal cell differs in the period where the gate wiring is selected and the period where it is not. However, according to this embodiment, during the polymer stabilization process, since the gate pulse is always at a constant voltage level and the pixel TFT is made in a conductive state, the charge consumed by the leak of the current is supplied to the liquid crystal cell and the storage capacitance through the pixel TFT, and the potential of the liquid crystal cell is held constant.

When the voltage applied to the liquid crystal layer becomes constant in the pixel portion, ultraviolet rays are irradiated from a perpendicular direction to the entire substrate surface for 10 seconds. The ultraviolet rays irradiated to the liquid crystal layer is 10 mW/cm$^2$ when measured at the incident surface of light.

From the above, even in an active matrix liquid crystal display device, the polymer stabilization process of ferroelectric liquid crystal may be performed.

The manufacturing process of the liquid crystal display device of Embodiment 4 and the order of the process of this embodiment are explained with reference to FIG. 5. The process from the formation of the orientation film to the flexible printed circuit pasting are performed, and an external signal is input from the flexible printed circuit. By making the voltage level of the gate start pulse of the external signal constant, a liquid crystal response with a stable voltage applied to the liquid crystal is conducted.

The element substrate having the orientation film performed with rubbing, and the opposing substrate are pasted together by a sealing agent and after the sealing agent is hardened, are split into individual panels. The panels are injected with liquid crystal material containing ferroelectric liquid crystal and liquid crystal polymer, and after sealing the inlet, the FPC is pasted. By the external signal input from the FPC, the liquid crystal responses, and after the response of liquid crystal is completely finished, ultraviolet rays are irradiated, to monostabilize the ferroelectric liquid crystal.

Embodiment 6

(An Example of a Method of Polymer Stabilization Processing)

In a reflection type liquid crystal display device or a transmission type liquid crystal display device, a method of monostabitizing the ferroelectric liquid crystal by liquid crystal polymer is shown below. This embodiment is described referring to FIGS. 10 to 14. The dashed lines A-A' of FIG. 10 is a cross section cut along the dashed line A-A' of FIG. 14. Further, the dashed lines D-D' and E-E' of FIG. 10 are cross sections cut along the dashed lines D-D' and E-E' FIG. 12.

FIG. 14 shows a top view of a reflection type liquid crystal display device or a transmission type liquid crystal display device. The element substrate of the liquid crystal display device of FIG. 14 is formed with a gate driver 521 and a source driver 522.

In both a reflection type liquid crystal display device and a transmission type liquid crystal display device, the position where the flexible printed circuit 519 is arranged and where the common pad 520 is arranged is the same. FIG. 14 shows the external appearance of an active matrix liquid crystal display device, which may be applied to a reflection type liquid crystal display device and a transmission type liquid crystal display device.

As shown in FIG. 10, after pasting a flexible printed circuit to the reflection type liquid crystal display device obtained in the process of Embodiment 4, a sheet 300 having a conductivity is arranged in the pixel portion on the back surface of the element substrate. As the conductive sheet, for example, a conductive film may be formed. Further, the metal plate may be formed to contact the substrate 400. Further a tape which is conductive and has cohesiveness may be pasted so the electric field covers the pixel portion.

The substrate 508 of the opposing substrate is formed with a transparent conductive film 510.

The conductive paste is dispensed in opposing substrate which is the common contact pad 520. The conducive paste is a sealing agent 515 mixed with a conductive spacer 516. The conductive spacer is coated with particulate gold powder on the surface thereof. By arranging the conductive paste on the common pad 520, the transparent conductive film 510 which is the opposing substrate, and the lead wire 517 for adhering the flexible printed circuit are electrically connected.

The opposing substrate and the element substrate are pasted together by the sealing agent 513. Thereafter, the liquid crystal material 514 is injected. The liquid crystal material 514 refers to the mixture of ferroelectric liquid crystal and liquid crystal polymer.

With the anisotropic conductive film 519, the flexible printed circuit 518 is adhered. As a result, the potential of the flexible printed circuit 518 and the transparent conductive film 510, which is the opposing substrate, become the same. A direct current is applied in between the flexible printed circuit 518 and the conductive sheet 300 to perform a polymer stabilization process. The value of the direct current of the power source is calculated as 1 as described above.

The cell gap is 2.5 μm, the glass of the element substrate has a relative dielectric constant of 3.0, the voltage to be applies to the liquid crystal maternal is 4V. Of the liquid crystal material, if the relative dielectric constant is 18 and the glass thickness of the element substrate is 300 μm, the direct current value becomes 2.9 kV. Most of the applied direct current is applied to glass.

Direct current is supplied by the regulated DC power supply. For example, with tho mold number C3350 of the regulated DC power supply of Hamamatsu Photonics K.K., a direct voltage of 0 to ±3.0 kV can be applied.

While applying a direct current, ultraviolet rays are irradiated in a perpendicular direction to the entire surface of the substrate. An ultraviolet ray is irradiated in a perpendicular direction onto the entire surface of the substrate for 10 seconds. The ultraviolet rays irradiated to the liquid crystal panel are measured to be 10 mW/cm$^2$ at the incident surface of light.

As a result, monostabilization of ferroelectric liquid crystal is performed. After the completion of monostabilization, the conductive sheet 300 may be peeled off.

When a polysilicon is used as a semiconductor layer as shown in FIG. 11, the driver circuit portion 506 and the pixel portion 507 may be formed on the same substrate. The conductive sheet 300 may be adhered on only the pixel portion so that a direct current voltage is not applied to the driver circuit portion.

The order of the processes of Embodiment 4 and this embodiment is shown in FIG. 13. The feature is in that after the orientation film is formed (1), the sealing agent for the liquid crystal inlet (13) is coated, and the flexible printed circuit is pasted (10), the conductive sheet is pasted to the back surface of the element substrate (11), so that a direct current may be applied between the transparent conductive film which is the opposing substrate and the conductive sheet.

The conductive sheet may be peeled off after monostabilization, so that the liquid crystal material may be monostabilized by a voltage with the same polarity in a simplified process and at a given voltage.

Embodiment 7

(An Example of a Method of a Polymer Stabilization Processing)

In both a reflection type liquid crystal display device and a transmission type liquid crystal display device, a method of monostabilizing a ferroelectric liquid crystal by a liquid crystal polymer is described below. This embodiment is explained with reference to FIGS. 6 to 9 and FIG. 14. The dashed line C-C' of FIG. 6 is a cross section of FIG. 14 cut along the dashed line C-C'. Further, the dashed line B-B' of FIGS. 6 and 7 is a cross section of FIG. 8 cut along the dashed line B-B'.

FIG. 14 is a top view showing a reflection type liquid crystal display device and a transmission type liquid crystal display device. The element substrate of the liquid crystal display device of FIG. 14 is formed with a gate driver 521 and a source driver 522.

As shown in FIG. 6, on the substrate 400, as a conductive film 200 an ITO film is formed with a thickness of 100 to 120 nm on only the pixel portion. The ITO film arranged on the driver circuit portion may be removed by patterning. Further to protect the semiconductor layer, the region where the semiconductor layer is arranged may be removed of the ITO film. Depending on the film formation method, the ITO film is ensured a heat resistance of up to about 500° C. According to the manufacturing process of the element substrate of Embodiment 1, the maximum temperature of the formation process of the element may be 500° C. or less.

By providing a conductive film on the substrate from the region where the semiconductor layer is arranged, the direct voltage of when the liquid crystal is monostabilized may be prevented from being applied to the semiconductor layer.

Below is described the relative dielectric constant and the film thickness of the insulating film to be used in FIG. 6.

A film with a low relative dielectric constant and with a thickness of 1 to 6 μm is formed, and the decrease of the parasitic capacitance formed between the wiring of the element and the conductive film 200 is performed. In this embodiment, as a film 201 with a low relative dielectric constant, a silicon dioxide ($SiO_2$) film with a relative dielectric constant of 4.0 and with a thickness of 1.0 μm is formed.

By a base film 401, the impurity such as an alkaline metal which flows from the glass substrate is prevented from polluting the semiconductor layer. As the base film, silicon nitride, silicon dioxide and the like may be used. For example, a silicon nitride (SiN) film 401 with a relative dielectric constant of 6.5 is formed with a thickness of 10 nm.

As a gate insulating film 432, a silicon nitride oxide film with a relative dielectric constant of 4.0 is formed with a thickness of 100 nm. As a first interlayer film 457, a silicon nitride oxide film with a relative dielectric constant of 4.0 is formed with a thickness of 150 nm. As a second interlayer film 458, an acrylic resin with a relative dielectric constant of 4.0 is formed with a thickness of 2.0 μm.

The liquid crystal material 514 refers to the ferroelectric liquid crystal and a liquid crystal polymer and a polymerization initiator. The ferroelectric liquid crystal used in this embodiment has a relative dielectric constant of 30. The cell gap is 1.0 μm for the reflection type liquid crystal display device. The thickness of the orientation films 511 and 512 are 40 nm with a relative dielectric constant of 4.0.

From the above configuration, when a direct voltage of 10V is to be applied to the liquid crystal material 514, it can be seen by calculation that a voltage of 260V may be applied in between the conductive film 200 and a transparent conductive film 510 formed on the opposing substrate 508 described later.

Next, a method of applying a direct voltage is described in FIGS. 6 and 14.

As shown in FIG. 6, a light shielding film 509 is formed on the opposing glass substrate 508. As the light shielding film, chromium or the like may be used.

On the light shielding film 509 is formed the transparent conductive film 510. As the transparent conductive film, an ITO film may be used.

As shown in FIGS. 6 and 14, there is a contact pad 520 with the transparent conductive film 510 which is an opposing substrate and a light shielding film 509 laminated into two layers. A conductive paste is formed on the contact pad 520.

The conductive paste is a sealing agent 515 mixed with a conductive spacer 516. The conductive spacer is a particulate spacer with gold powder coated on the surface thereof. By arranging the conductive paste on the common pad 520, the lead wire 517 which bonds the transparent conductive film 510 which is an opposing substrate and a flexible print wiring plate is electrically connected.

By the orientation films 511 and 512, the liquid crystal material 514 is oriented. The sealing agent 513 is formed.

By an anisotropic conductive film 519, a flexible printed circuit 518 is bonded. Thereby, a direct voltage is applied in between the flexible printed circuit 518 and the conductive film 200 formed on the element substrate 400 to perform the polymer stabilization process.

The order of processes of Embodiment 4 and this embodiment are shown in FIG. 9. The feature is in that the orientation film is formed (1) to when the flexible printed circuit is pasted (10), then a direct current power source is applied in between a wiring which has a continuity state with the common pad which is the opposing substrate from the flexible printed circuit, and the conductive film formed on the element substrate.

Embodiment 8

(The Crystallization Method of a Semiconductor Layer Using a Catalyst Element)

This embodiment shows another method of manufacturing a crystalline semiconductor layer forming a semiconductor layer of a TFT of an active matrix substrate shown in Embodiment 1. This embodiment may also be applied with a crystallization method using a catalyst element disclosed in Japanese Patent Application Laid-open No. Hei 7-130652. Hereinbelow are examples showing such a case.

Similarly to Embodiment 1, a base film amorphous semiconductor layer is formed on a glass substrate with a thickness of 25 to 80 nm. For example, an amorphous silicon film is formed with a thickness of 55 nm. Then, an aqueous solution containing a catalyst element which is 10 ppm by weight conversion is applied by a spin coating method to form a layer including a catalyst element. As a catalyst element, there are such as nickel (Ni), germanium (Ge), iron (Fe), palladium (Pd), tin (Sn), lead (Pb), cobalt (Co), platinum (Pt), copper (Cu) and gold (Au). A layer 170 containing this catalyst element may be formed with a thickness of 1 to 5 nm.

In the crystallization process, first heat treatment is performed for about an hour at 400 to 500 C., then the hydrogen amount contained in the amorphous silicon film is made to be 5 atomic % or less. Then, the furnace annealing oven is used, to perform heat annealing for 1 to 8 hours at 550 to 600 C. With the above processes, a crystalline semiconductor layer formed from a crystalline silicon film may be obtained.

If an island shaped semiconductor layer is manufactured from a crystalline semiconductor layer manufactured in this way, an active matrix substrate may be completed similarly to Embodiment 1. However, when the catalyst element which promotes crystallization of the silicon in the process of crystallization is used, a minute amount ($1 \times 10^{17}$ to $1 \times 10^{19}$ atoms/$cm^3$) of the catalyst element remains in the island shaped semiconductor layer. Of course, it is possible to complete the TFT in such a state, but it is more preferable to remove the remaining catalyst element at least from the channel forming region. As a method of removing the catalyst element, there is a method of using a Bettering action by phosphorus (P).

The gettering process by phosphorus (P) for this object, may simultaneously be performed in the activation process explained in FIG. 6C. The concentration of phosphorus (P) necessary for gettering may be about the same as the impurity concentration of the high concentration n-type impurity region, and by annealing, the catalyst element from the channel forming region of the n-channel TFT and the p-channel TFT may be segregated to an impurity region containing phosphorus (P) at such a concentration. As a result, in the impurity region the catalyst element at about $1\times10^{17}$ to $1\times10^{19}$ is segregated. In this way, the manufactured TFT has decreased off current value, and since crystallinity is good a high electric field effect mobility is obtained, to thereby realize a good characteristic.

Note that, this embodiment may be freely combined with any one of Embodiments 1 to 7.

Embodiment 9

CMOS circuits and pixel portions formed by implementing the present invention can be used in a variety of semiconductor devices (an active matrix liquid crystal display, an active matrix EC display). Namely, the present invention can be implemented for all electric equipment, which incorporates this type of semiconductor device in a display portion. A sensor may be incorporated in the following devices so as to detect brightness of the outside and lower luminance in the dark place for reducing power consumption in the devices.

Figure 20A:
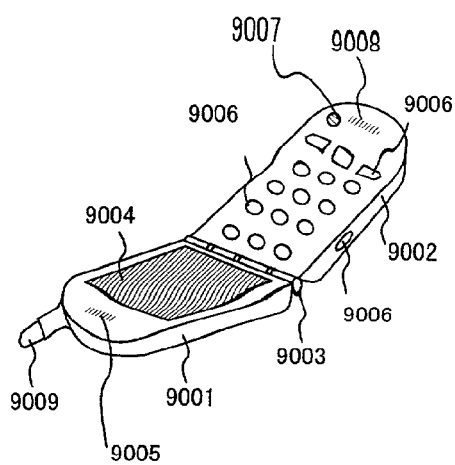
FIGS. 20A to 20F show perspective views of examples of electronic equipment of Embodiment 9.

FIG. 20A shows a portable telephone, which contains a display panel 9001, an operating panel 9002, a connecting portion 9903, a display device 9004, a sound output portion 9005, operation keys 9006, a power supply switch 9007, a sound input portion 9008, and an antenna 9009. The present invention can be applied to the display device 9004 equipped with the active matrix substrate.

Figure 20B:
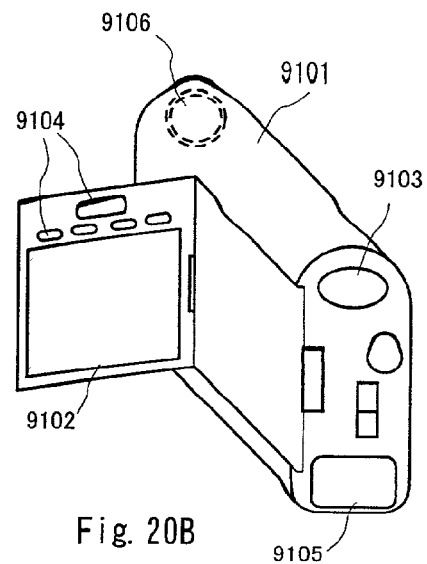

FIG. 20B shows a video camera, which contains a main body 9101, a display device 9102, a sound input portion 9103, operation switches 9104, a battery 9105, and an image receiving portion 9106. The present invention can be applied to the display device 9102 equipped with the active matrix substrate.

Figure 20C:
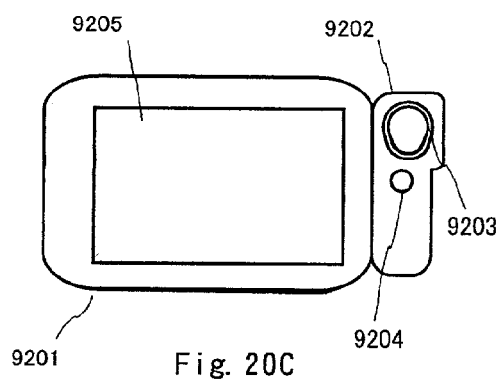

FIG. 20C shows a mobile computer or a portable information terminal, which contains a main body 9201, a camera portion 9202, an image receiving portion 9203, an operation switch 9204, and a display device 9205. The present invention can be applied to the display device 9205 equipped with the active matrix substrate.

Figure 20D:
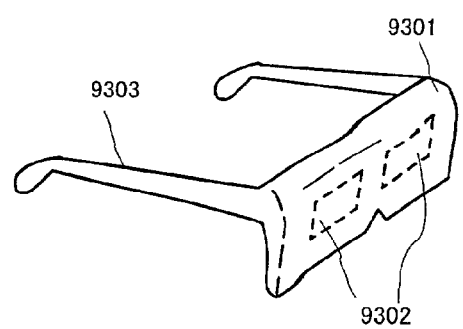

FIG. 20D shows a head mounted display, which contains a main body 9301, display devices 9302, and arm portions 9303. The present invention can be applied to the display devices 9302.

Figure 20E:
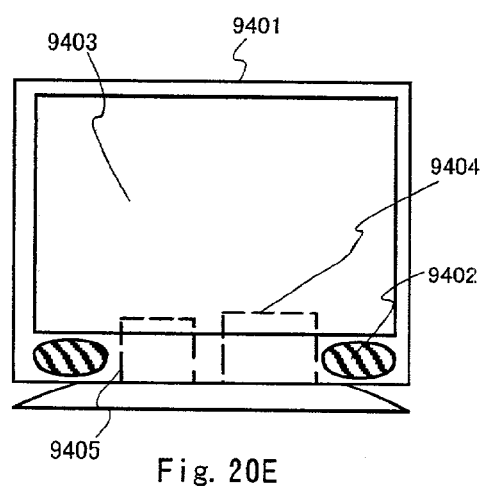

FIG. 20E shows a television set, which contains a main body 9401, speakers 9402, a display device 9403, a receiving device 9404, an amplifying device 9405, and the like. The present invention can be applied to the display device 9403.

Figure 20F:
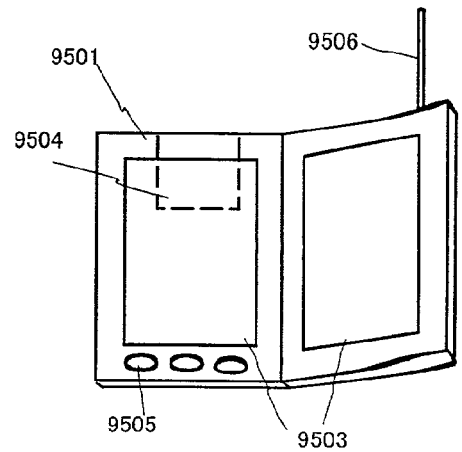

FIG. 20F shows a portable book, which contains a main body 9501, display devices 9502 and 9503, a storage medium 9504, operation switches 9505, and an antenna 9506 and display data stored in a mini disk (MD) or DVD or data received by the antenna. The present invention can be applied to the display devices 9502 and 9503 that are direct-view type.

Figure 21A:
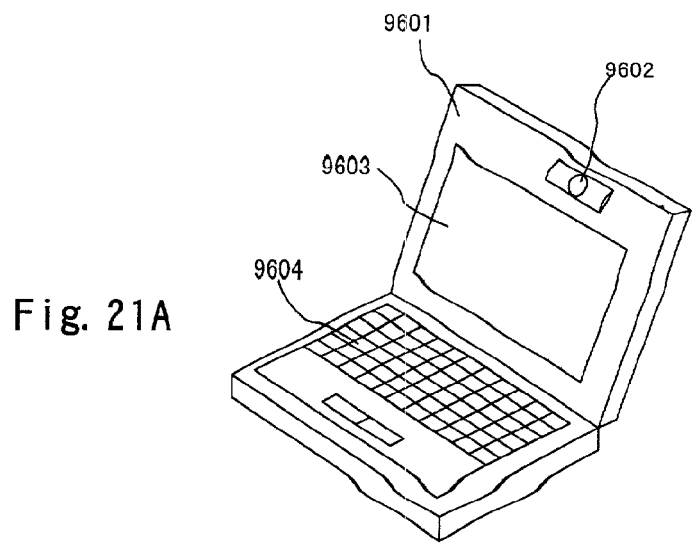
FIGS. 21A to 21C show perspective views of examples of the electronic equipment of Embodiment 9.

FIG. 21A shows a personal computer, which contains a main body 9601, an image input portion 9602, a display device 9603, and a keyboard 9604.

Figure 21B:
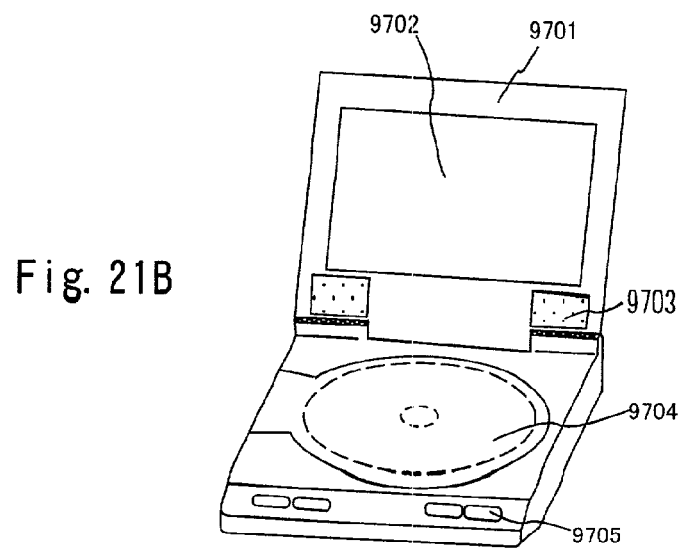

FIG. 21B shows a player using a recording medium having recorded a program thereon (hereafter referred to as a recording medium), which contains a main body 9701, a display device 9702, speaker portions 9703, a recording medium 9704, and operation switches 9705. Note that this device uses a medium such as DVD (digital versatile disk) or a CD as a recording medium, and can be used for music appreciation, film appreciation, games, and the Internet.

Figure 21C:
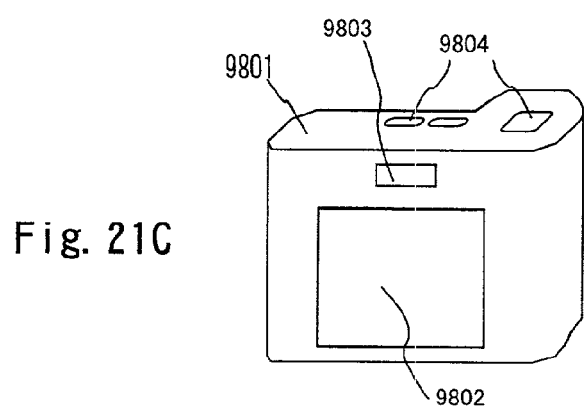

FIG. 21C shows a digital camera, which contains a main body 9801, a display device 9802, an eyepiece portion 9803, operation switches 9804, and an I image receiving portion (not shown).

Figure 22A:
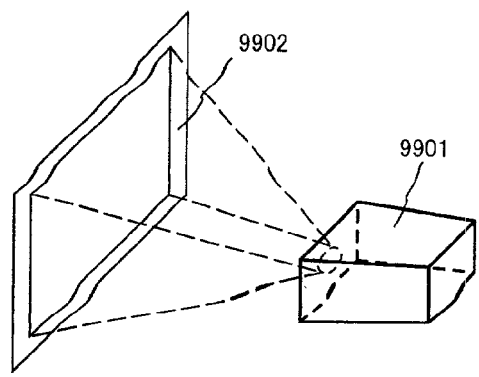
FIGS. 22A to 22D show perspective views of examples of the electronic equipment of Embodiment 9.

FIG. 22A shows a front-type projector, which contains a projecting device 9901, and a screen 1902. The present invention can be applied to the display device.

Figure 22B:
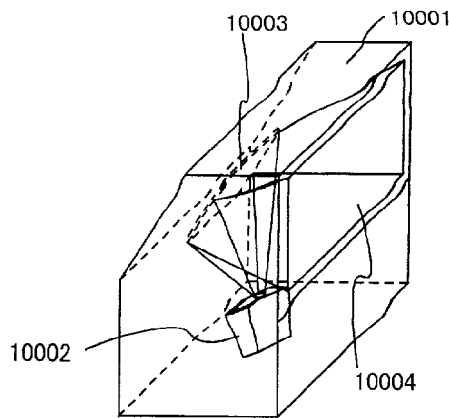

FIG. 22B shows a rear-type projector, which contains a main body 10001, a projecting device 10002, a mirror 10003, and a screen 10004. The present invention can be applied to the display device.

FIG. 21 is a diagram showing an example of the structure of the projecting devices 9901 and 10002 in FIGS. 22A and 22B. The projecting device 9901 or 10002 contains a light source optical system 10101, mirrors 10102 and 10104 to 10106, dichroic mirrors 10103, a prism 10107, liquid crystal display devices 10108, phase difference plates 10109, and a projection optical system 10110. The projection optical system 10110 consists of an optical system including a projection lens. This embodiment shows an example of three-plate type, but is not particularly limited thereto. For instance, a single plate type may be adopted. Further, in the light path indicated by an arrow in FIG. 22C, an optical system such as an optical lens, a film having a polarization function, a film for adjusting a phase difference or an IR film may be appropriately provided by an operator.

Figure 22C:
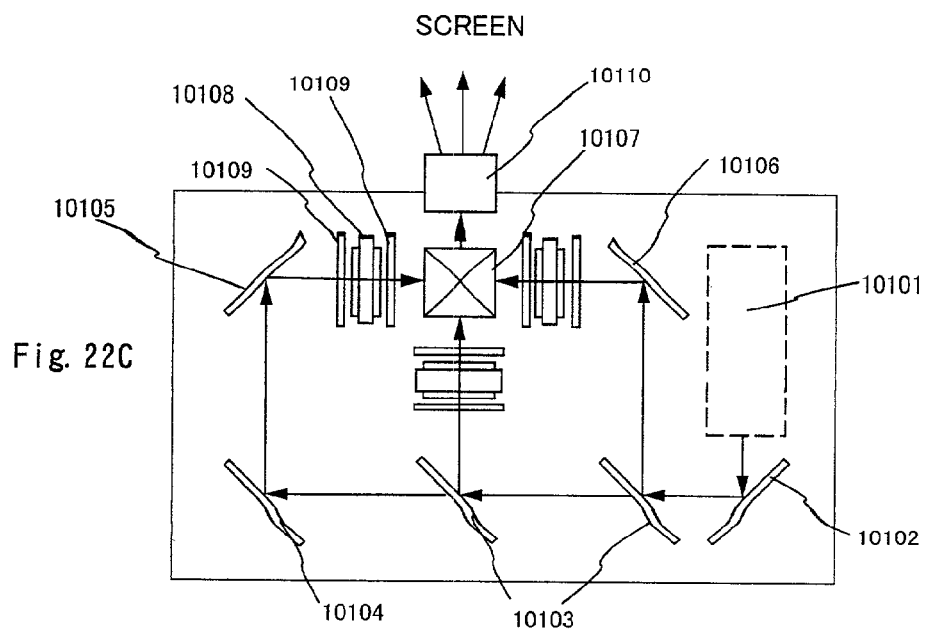
Figure 22D:
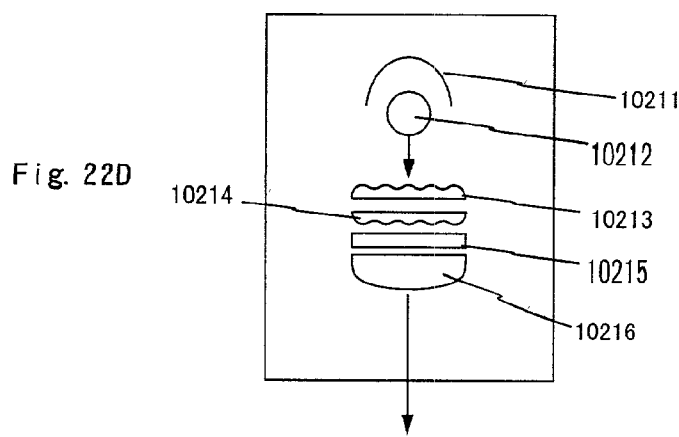
Figure 23:
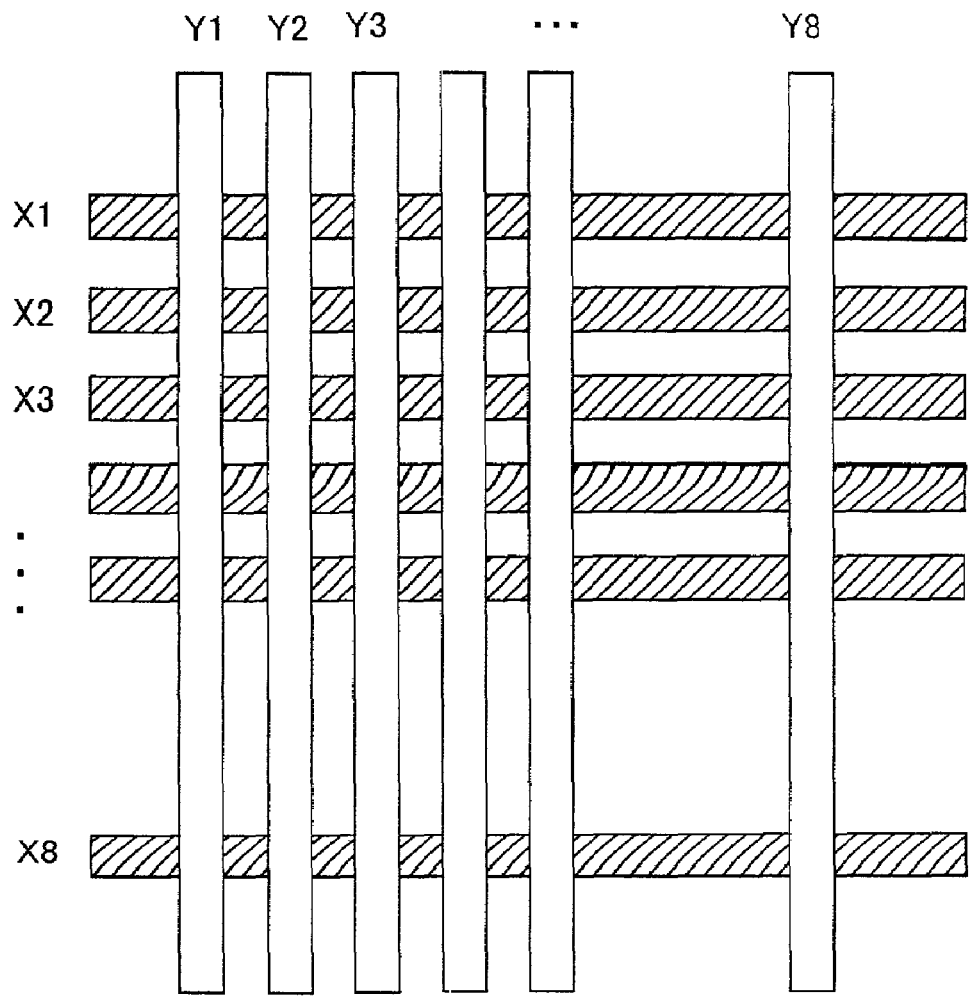
FIG. 23 shows a top surface diagram of a conventional example of a simple matrix liquid crystal display device.
Figure 24A:
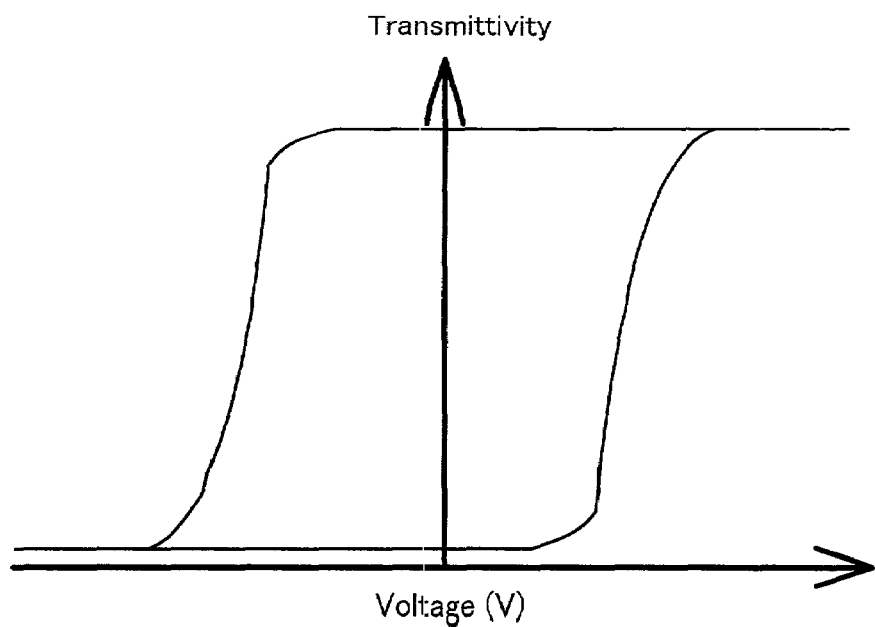
FIGS. 24A and 24B show the voltage—transmittivity characteristics of a conventional example of a ferroelectric liquid crystal.
Figure 24B:
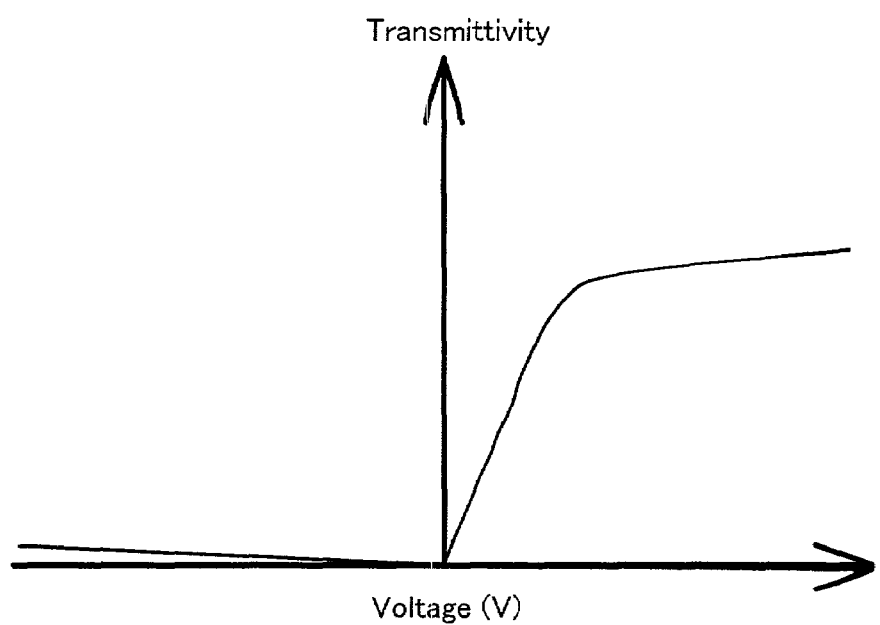

FIG. 22D is a diagram showing an example of the structure of the light source optical system 10201 in FIG. 22C. In this embodiment, the light source optical system 10201 contains a reflector 10211, a light source 10212, lens arrays 10213 and 10214, a polarization conversion element 10215, and a condenser lens 10216. The light source optical system shown in FIG. 22D is an example thereof, and is not particularly limited. For instance, an optical system such as an optical lens, a film having a polarization function, a film for adjusting a phase difference or an IR film may be appropriately provided by an operators Polymer stabilization processing of a ferroelectric liquid crystal can be performed on an active matrix substrate by using the present invention.

Means of applying a voltage necessary for making a liquid crystal, independent by pixel TFT, monostable by changing an input signal from the outside without changing source and gate driver circuits within a panel in the active matrix liquid crystal display device.

When line sequential driving is used, the voltage applied to the liquid crystal layer fluctuates due to the leak current of a storage capacitor or the liquid crystal layer, and the voltage when performing polymer stabilization processing of the ferroelectric liquid crystal becomes unstable. However, polymer stabilization processing can be performed by a constant voltage in accordance with the present invention.

There is a limitation in the voltage applied to the liquid crystal layer due to the electric voltage resistance characteristics of elements with the active matrix liquid crystal display device, but a direct current voltage on the order of 10 V can be applied to the liquid crystal layer, and polymer stabilization processing can be performed, in accordance with the present invention.

What is claimed is:

1. A method of manufacturing an active matrix liquid crystal display device, wherein liquid crystals are made monostable by an electric field between a pixel electrode and an electrode opposite to said pixel electrode, while electric voltages of only a single polarity are applied to said pixel electrode and an ultraviolet ray is irradiated to said liquid crystals.

2. A method of manufacturing an active matrix liquid crystal display device, the method comprising:
   providing a liquid crystal layer between a pixel electrode and an electrode opposite to said pixel electrode, wherein liquid crystals of said liquid crystal layer have bistability or hysteresis characteristics;
   providing a period in which all gate wirings are selected simultaneously; and
   making liquid crystals monostable by an electric field between said pixel electrode and said electrode opposite to said pixel electrode, while electric voltages of only a single polarity are applied to said pixel electrode,
   wherein a gate start pulse is maintained at a constant voltage and wherein said gate wirings are placed in a state of being simultaneously selected.

3. A method of manufacturing an active matrix liquid crystal display device, wherein there is a period in which all gate wirings are selected simultaneously and wherein liquid crystals are made monostable by an electric field between a pixel electrode and an electrode opposite to said pixel electrode, while electric voltages of only a single polarity are applied to said pixel electrode and an ultraviolet ray is irradiated to said liquid crystals.

4. A method of manufacturing an active matrix liquid crystal display device comprising:
   forming a first conductive film over a first substrate;
   forming a first insulating film over said first conductive film;
   forming a thin film transistor over said first insulating film, wherein the thin film transistor includes at least a semiconductor layer having a source region and a drain region, a gate insulating film, and a gate electrode;
   forming a second insulating film over the thin film transistor;
   forming a pixel electrode over the second insulating film;
   forming a second conductive film over a second substrate;
   providing liquid crystals between said thin film transistor and said second conductive film; and
   applying an electric field to said liquid crystals by said first conductive film and said second conductive film so that said liquid crystals are made monostable,
   wherein said liquid crystals are smectic liquid crystals, and
   wherein forming the pixel electrode over the second insulating film comprises arranging the pixel electrode such that the first conductive film extends continuously under the entire pixel electrode.

5. A method of manufacturing an active matrix liquid crystal display device comprising:
   forming a first conductive film over a first substrate;
   forming a first insulating film over said first conductive film;
   forming a thin film transistor over said first insulating film, wherein the thin film transistor includes at least a semiconductor layer having a source region and a drain region, a gate insulating film, and a gate electrode;
   forming a second insulating film over the thin film transistor;
   forming a pixel electrode over the second insulating film;
   forming a second conductive film over a second substrate; and
   providing liquid crystals between said thin film transistor and said second conductive film,
   wherein said liquid crystals are smectic liquid crystals,
   wherein said liquid crystals are made monostable by an electric field applied to said liquid crystals by said first conductive film and said second conductive film while an ultraviolet ray is applied to said liquid crystals, and
   wherein forming the pixel electrode over the second insulating film comprises arranging the pixel electrode such that the first conductive film extends continuously under the entire pixel electrode.

6. A method of manufacturing an active matrix liquid crystal display device comprising:
   forming a first conductive film over a first surface of a first substrate;
   forming a thin film transistor over a second surface opposite to said first surface of said first substrate;
   forming a second conductive film over a second substrate;
   providing liquid crystals between said thin film transistor and said second conductive film,
   wherein said liquid crystals are smectic liquid crystals,
   wherein the thin film transistor includes at least a semiconductor layer having a source region and a drain region, a gate insulating film, and a gate electrode, and
   wherein said liquid crystals are made monostable by an electric field applied to said liquid crystals by said first conductive film and said second conductive film while an ultraviolet ray is applied to said liquid crystals.

7. The method of manufacturing an active matrix liquid crystal display device according to any one of claims 1 to 3, wherein said liquid crystals are smectic liquid crystals.

8. The method of manufacturing an active matrix liquid crystal display device according to any one of claims 4 to 7, wherein said smectic liquid crystals are ferroelectric liquid crystals.

9. The method of manufacturing an active matrix liquid crystal display device according to any of claims 1 to 3 and 4 to 6, wherein said liquid crystals are mixtures of a polymer material and a liquid crystal.

10. The method of manufacturing an active matrix liquid crystal display device according to claim 9, wherein a polymerization agent is added to said polymer material.

11. The method of manufacturing an active matrix liquid crystal display device according to claim 10, wherein said polymerization agent has optical polymerization or thermal polymerization properties.

12. The method of manufacturing an active matrix liquid crystal display device according to any one of claims 1 to 3 and 4 to 6, wherein said liquid crystal display device is incorporated into an electronic equipment selected from the group consisting of a portable phone, a video camera, a mobile computer, a head mounted display, a television set, a portable book, a personal computer, a player, a digital camera, a front-type projector and a rear-type projector.

* * * * *